(12) United States Patent
Arai

(10) Patent No.: US 7,337,056 B2
(45) Date of Patent: Feb. 26, 2008

(54) DRIVING CONTROL APPARATUS

(75) Inventor: Toshiaki Arai, Utsunomiya (JP)

(73) Assignee: Honda Motor Co., Ltd., Tokyo (JP)

(*) Notice: Subject to any disclaimer, the term of this patent is extended or adjusted under 35 U.S.C. 154(b) by 314 days.

(21) Appl. No.: 11/088,346

(22) Filed: Mar. 23, 2005

(65) Prior Publication Data

US 2005/0216169 A1 Sep. 29, 2005

(30) Foreign Application Priority Data

Mar. 29, 2004 (JP) ............................. 2004-094111
Mar. 29, 2004 (JP) ............................. 2004-094112

(51) Int. Cl.
B60K 31/00 (2006.01)

(52) U.S. Cl. .................. 701/96; 701/301; 180/170; 340/903

(58) Field of Classification Search .............. 701/93, 701/96, 300–302; 180/167, 170; 340/435, 340/436, 903
See application file for complete search history.

(56) References Cited

U.S. PATENT DOCUMENTS 6,032,097 A * 2/2000 Iihoshi et al. ................ 701/96
6,128,559 A * 10/2000 Saitou et al. ................ 701/23

FOREIGN PATENT DOCUMENTS

JP 60019208 1/1985

* cited by examiner

Primary Examiner—Yonel Beaulieu
(74) Attorney, Agent, or Firm—O'Melveny & Myers LLP

(57) ABSTRACT

Systems and apparatuses are provided for controlling the speed of a driver's vehicle either in a first adaptive cruise control mode or a second travel or stop mode. In one embodiment, there is provided an apparatus comprising a speed control unit that executes a follow-up control based at least in part on a target inter-vehicle distance between the driver's vehicle and a preceding vehicle (i.e., another vehicle in front of the driver's vehicle). The speed control unit executes adaptive cruise control when the driver requests the follow-up control while traveling at a speed equal to or higher than a first predetermined vehicle speed. The control unit executes stop-or-travel control when the driver requests the follow-up control while traveling at a speed equal to or lower than another predetermined vehicle speed lower than the first predetermined vehicle speed.

10 Claims, 12 Drawing Sheets

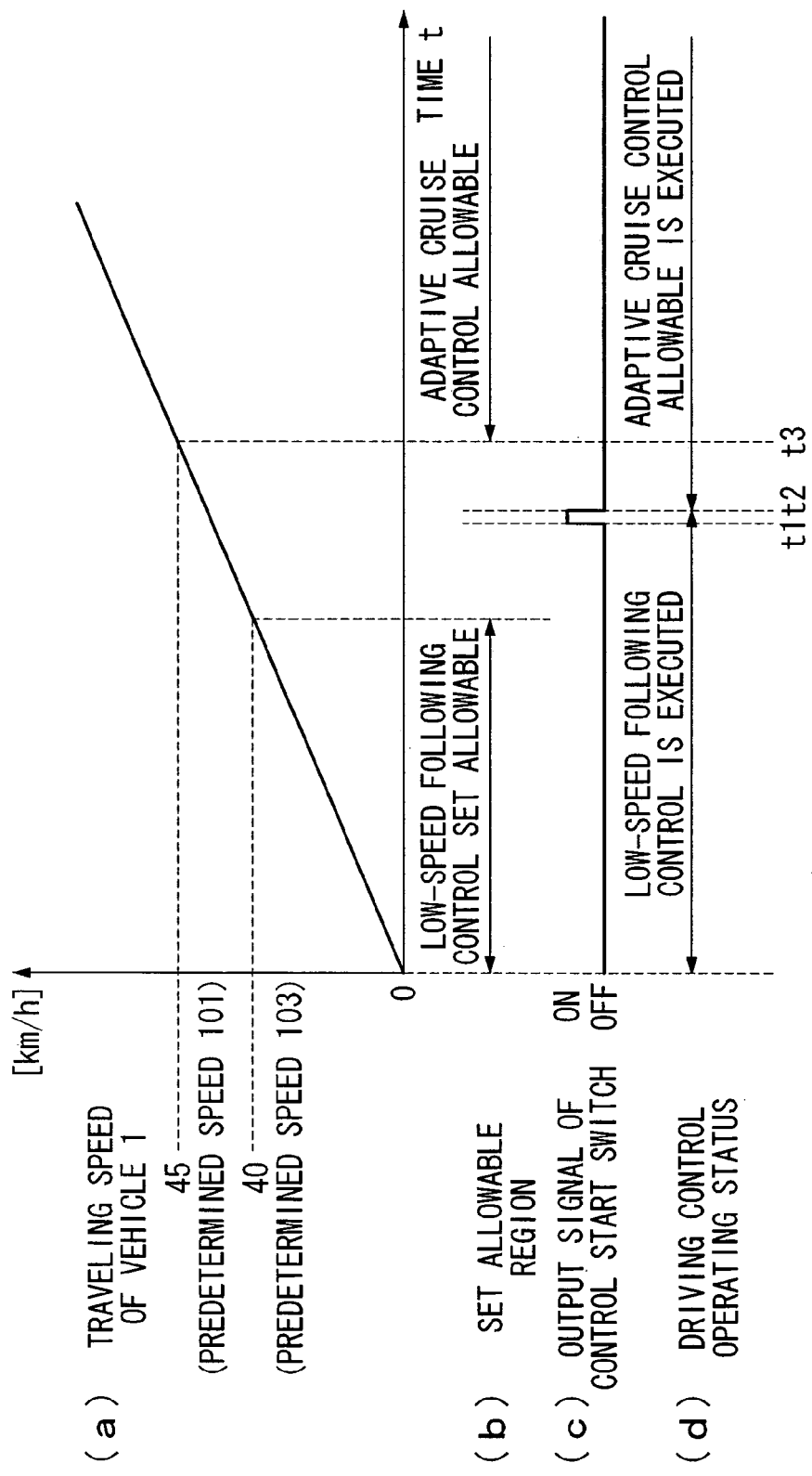

1
DRIVING CONTROL APPARATUS

BACKGROUND OF THE INVENTION

1. Field of the Invention

The present invention relates to a driving control apparatus that executes driving control of a vehicle by selecting a vehicle that is traveling in front of the vehicle and followed by that vehicle.

Priority is claimed on Japanese Patent Application Nos. 2004-94111 and 2004-94112, filed Mar. 29, 2004, the contents of which are incorporated herein by reference.

2. Description of Related Art

Conventionally, an automatic start/stop apparatus for a vehicle has been used in order to reduce stress on the driver who has to often start or stop a vehicle following the preceding vehicle in a traffic jam, for example. Such an apparatus that executes driving control of a vehicle by setting a preceding vehicle that travels in front of a vehicle and the vehicle follows. More specifically, the apparatus determines the relationship between an inter-vehicle distance to the preceding vehicle detected by inter-vehicle distance detecting means and an inter-vehicle distance that is required to ensure safety detected by a safe inter-vehicle distance detecting means, and decelerates the vehicle when the relationship in a deceleration region whereas accelerating the vehicle when the relationship in an accelerating region. Since this apparatus automatically repeats acceleration and deceleration of the vehicle following the preceding vehicle, it can reduce stress on the driver (for example, Japanese Unexamined Patent, First Publication No. S60-19208).

In addition to an automatic start/stop control function that automatically starts or stops the vehicle in response to a start or stop of the preceding vehicle, some conventional automatic start/stop apparatuses are equipped with an adaptive cruise control function that automatically makes the vehicle travel following the preceding vehicle while keeping a certain distance between the preceding vehicle when both the vehicle and the preceding vehicle travel at a speed greater than a predetermined value. In such an apparatus, for example, the automatic start/stop control function keeps controlling the vehicle to the point in which the vehicle stops while the adaptive cruise control function terminates the control when the vehicle reaches the lower limit speed to execute the adaptive cruise control function. In this manner, since the automatic start/stop control function and the adaptive cruise control function are different in terms of control, it is required for a driver to recognize which of the control modes is currently executed.

Therefore, in a conventional driving control apparatus, instead of automatically switching between the automatic start/stop control function and the adaptive cruise control function, the control is terminated at the point when the traveling speed of the vehicle reaches to a speed for switching between the control modes, and the driver needs to instruct the start of the adaptive cruise control. Thus, the driver easily recognizes which of the control modes is currently executed (i.e., the automatic start/stop control, or the adaptive cruise control). Therefore, the driver may experience discomfort because the driving control is temporality halted until the operation by the driver that instructs the adaptive cruise control is detected after the vehicle reaches the speed for switching between the automatic start/stop control function and the adaptive cruise control function, or because the driving control may be terminated even when the driver wants to switch the modes.

SUMMARY OF THE INVENTION

The present invention was conceived in view of the above-identified background, and an object thereof is to provide a driving control apparatus that can smoothly switch control modes of the vehicle in response to an instruction by a driver.

In order to solve the above-described problems, a driving control apparatus of a first aspect of the present invention is a driving control apparatus including: a vehicle speed detecting unit that detects a traveling speed of a vehicle; a follow-up control request detecting unit that detects an operation by a driver requesting a follow-up control; an object detecting unit that is installed in the vehicle and detects objects that are present in a direction in which the vehicle travels; a preceding vehicle determining unit that determines a vehicle that is traveling in front of the vehicle and followed by that vehicle among the objects detected by the object detecting unit; a target inter-vehicle distance determining unit that determines a target inter-vehicle distance between the vehicle and the preceding vehicle; a target vehicle speed determining unit that determines a target vehicle speed of the vehicle based on a signal from the object detecting unit and the target inter-vehicle distance determined; and a follow-up control unit that controls a follow-up control on the preceding vehicle based on the determined target vehicle speed and the traveling speed of the vehicle, wherein the follow-up control unit, when the operation by the driver requesting the follow-up control is detected while the vehicle is traveling at a speed equal to or higher than a first predetermined vehicle speed, executes an adaptive cruise control in which the vehicle is made to travel at a speed higher than a second predetermined vehicle speed that is lower than the first predetermined vehicle speed, and the follow-up control unit, when the operation by the driver requesting the follow-up control is detected while the vehicle is traveling at a speed equal to or lower than a third predetermined vehicle speed that is lower than the first predetermined vehicle speed, executes a low-speed following control in which the vehicle is made to travel or stop following the preceding vehicle. In the driving control apparatus having the above-mentioned configuration, the follow-up control unit, when the operation by the driver requesting the follow-up control is detected while the vehicle is traveling at a speed equal to or higher than the first predetermined speed, executes the adaptive cruise control in which the vehicle is made to travel down to the second predetermined vehicle speed at which the vehicle is not required to be stopped or started following the preceding vehicle while keeping a certain distance between the preceding vehicle. Thus, it is possible to make the vehicle travel following the precedent vehicle down to the second predetermined vehicle speed even when the speed of the vehicle is reduced the first predetermined vehicle speed or lower. In contrast, the follow-up control unit, when the operation by the driver requesting the follow-up control is detected while the vehicle is traveling at a speed equal to or lower than the third predetermined speed at which the vehicle is required to be stopped or started following the precedent vehicle, executes the low-speed follow control in which the vehicle is made to travel or stop following the preceding vehicle. Thus, it is possible to make the vehicle travel or stop following the precedent vehicle up to the first predetermined vehicle speed.

According to a second aspect of the present invention, in the driving control apparatus of the first aspect of the present invention, the second predetermined vehicle speed may be equal to or lower than a third predetermined vehicle speed.

According to a third aspect of the present invention, in the driving control apparatus of the first aspect of the present invention, the follow-up control unit may terminate the adaptive cruise control and start the low-speed following control when the traveling speed of the vehicle is reduced to the second predetermined vehicle speed or lower within a predetermined time period after the operation by the driver requesting the follow-up control is detected while the adaptive cruise control is executed.

The driving control apparatus having such a configuration can terminate the adaptive cruise control and start the low-speed following control for the vehicle within a predetermined time period after the operation by the driver requesting the follow-up control is detected while the adaptive cruise control is executed, provided that the traveling speed of the vehicle is reduced to the second predetermined vehicle speed or lower.

According to a fourth aspect of the present invention, in the driving control apparatus of the first aspect of the present invention, the follow-up control unit may continue the adaptive cruise control within the traveling speed of the vehicle is not reduced to the second predetermined vehicle speed or lower within a predetermined time period after the operation by the driver requesting the follow-up control is detected while the adaptive cruise control is executed.

The driving control apparatus having such a configuration can determine that starting the low-speed following control is not required and continue the adaptive cruise control when the traveling speed of the vehicle is not reduced to the second predetermined vehicle speed or lower within a predetermined time period after the operation by the driver requesting the follow-up control is detected while the adaptive cruise control is executed.

According to a fifth aspect of the present invention, in the driving control apparatus of the first aspect of the present invention, the driving control apparatus may include a warning unit that provides the driver with a warning according to a control status of the follow-up control unit, and the follow-up control unit may start the low-speed following control when the operation by the driver requesting the follow-up control is detected while the warning unit is providing the warning and when the traveling speed of the vehicle is reduced to the second predetermined vehicle speed or lower within a predetermined time period after the operation is detected.

The driving control apparatus having such a configuration can retain the operation by the driver requesting the follow-up control who is warned by the warning unit even when the traveling speed of the vehicle is higher than the third predetermined vehicle speed at which an execution of the low-speed following control is allowed. The driving control apparatus can process the retained operation that has been made by the driver as a valid operation to start the low-speed following control when the traveling speed of the vehicle is reduced to the second predetermined vehicle speed or lower to start the low-speed following control within a predetermined time period after the operation by the driver is detected.

In the driving control apparatus according to a sixth aspect of the present invention, the warning unit may provide the driver with the warning in one of the following cases: when the adaptive cruise control is terminated by a factor other than an operation by the driver; when the traveling speed of the vehicle is reduced to the second predetermined vehicle speed or lower during a deceleration control related to the adaptive cruise control; and when the inter-vehicle distance between the vehicle and the preceding vehicle is reduced to a predetermined distance or shorter.

The driving control apparatus having such a configuration can notify the driver in the following events: the adaptive cruise control is terminated by a factor other than an operation by the driver; the traveling speed of the vehicle is reduced to the second predetermined vehicle speed or lower during a deceleration control related to the adaptive cruise control; and when the inter-vehicle distance between the vehicle and the preceding vehicle is reduced to a predetermined distance or shorter.

In order to solve the above-described problems, a driving control apparatus of a seventh aspect of the present invention is a driving control apparatus including: a vehicle speed detecting unit that detects a traveling speed of a vehicle; a follow-up control request detecting unit that detects an operation by a driver requesting a follow-up control; an object detecting unit that is installed in the vehicle and detects objects that are present in a direction in which the vehicle travels; a preceding vehicle determining unit that determines a vehicle that is traveling in front of the vehicle and followed by that vehicle among the objects detected by the object detecting unit; a target inter-vehicle distance determining unit that determines a target inter-vehicle distance between the vehicle and the preceding vehicle; a target vehicle speed determining unit that determines a target vehicle speed of the vehicle based on a signal from the object detecting unit and the target inter-vehicle distance determined; and a follow-up control unit that controls a follow-up control on the preceding vehicle based on the determined target vehicle speed and the traveling speed of the vehicle, wherein the follow-up control unit, when the operation by the driver requesting the follow-up control is detected while the vehicle is traveling at a speed equal to or higher than a first predetermined vehicle speed, executes an adaptive cruise control in which the vehicle is made to travel at a speed equal to or higher than a second predetermined vehicle speed that is lower than the first predetermined vehicle speed, and the follow-up control unit, when the operation by the driver requesting the follow-up control is detected while the vehicle is traveling at a speed equal to or lower than a third predetermined vehicle speed that is lower than the first predetermined vehicle speed, executes a low-speed following control in which the vehicle is made to travel or stop following the preceding vehicle at a traveling speed equal to or lower than a fourth predetermined vehicle speed that is higher than a third predetermined vehicle speed.

In the driving control apparatus having the above-mentioned configuration, the adaptive cruise control unit, when an operation by the driver requesting the follow-up control is detected while the vehicle is traveling at a speed equal to or higher than the first predetermined speed, executes the adaptive cruise control in which the vehicle is made to travel down to the second predetermined vehicle speed at which the vehicle is not required to be stopped or started following the preceding vehicle while keeping a certain distance between the preceding vehicle. Thus, it is possible to make the vehicle travel following the precedent vehicle down to the second predetermined vehicle speed even when the speed of the vehicle is reduced the first predetermined vehicle speed or lower. In contrast, the follow-up control unit, when the operation by the driver requesting the follow-up control is detected while the vehicle is traveling at a speed equal to or lower than the third predetermined vehicle speed, executes an low-speed follow control in which the vehicle is made to travel or stop up to the fourth vehicle speed at which the vehicle is no more required to be stopped or started following the preceding vehicle. Thus, it is possible to make the vehicle travel or stop following the preceding vehicle up to the fourth predetermined vehicle speed even when the vehicle speed of the vehicle becomes higher than the third predetermined vehicle speed.

According to a seventh aspect of the present invention, in the driving control apparatus of the seventh aspect of the present invention, the follow-up control unit may terminate the low-speed following control and start the adaptive cruise control if an operation by the driver requesting the follow-up control is detected when the traveling speed of the vehicle is equal to or higher than the third predetermined vehicle speed while the low-speed following control is executed.

The driving control apparatus having such a configuration can terminate the low-speed following control and start the adaptive cruise control if the operation by the driver requesting the follow-up control is detected when the traveling speed of the vehicle is equal to or higher than the third predetermined vehicle speed while the low-speed following control is executed even when the traveling speed of the vehicle is the first predetermined vehicle speed or lower.

According to a ninth aspect of the present invention, in the driving control apparatus of the seventh aspect of the present invention, the follow-up control unit may terminate the low-speed following control and start the adaptive cruise control when the traveling speed of the vehicle is increased to the first predetermined vehicle speed or higher if an operation by the driver requesting the follow-up control is detected when the traveling speed of the vehicle is equal to or higher than the third predetermined vehicle speed while the low-speed following control is executed.

The driving control apparatus having such a configuration can retain the operation by the driver requesting the follow-up control when the traveling speed of the vehicle is the third predetermined vehicle speed or higher while the low-speed following control is executed. The driving control apparatus can process the retained operation that has been made by the driver as a valid operation to terminate the low-speed following control and start the adaptive cruise control when the traveling speed of the vehicle is increased to the first predetermined vehicle speed in which the adaptive cruise control can be set or higher.

According to the driving control apparatus of the first aspect of the present invention, when an operation by the driver requesting the follow-up control is detected while the vehicle is traveling at a speed equal to or higher than the first predetermined vehicle speed, the vehicle is made to travel by the adaptive cruise control down to the second predetermined vehicle speed at which the vehicle is not required to be stopped or started following the preceding vehicle while keeping a certain distance from the preceding vehicle. In contrast, the vehicle is made to travel or stop following the preceding vehicle up to the first predetermined vehicle speed by the low-speed following control when the vehicle is traveling at a speed equal to or lower than the third predetermined vehicle speed at which the vehicle is required to be stopped or started following the preceding vehicle.

Thus, a driving control apparatus that can make the vehicle travel smoothly in response to instructions from the driver can be realized by making the vehicle travel following the preceding vehicle utilizing the adaptive cruise control or the low-speed following control while adequately switching between the adaptive cruise control and low-speed following control depending on travel conditions.

According to the driving control apparatus of the second aspect of the present invention, the adaptive cruise control and the low-speed following control can be switched at the second predetermined vehicle speed since the second predetermined vehicle speed is set a value equal to or lower than that of the third predetermined vehicle speed.

Thus, the adaptive cruise control and the low-speed following control can be switched seamlessly. Accordingly, a driving control of the vehicle that conforms to the driving experience by the driver can be executed.

According to the driving control apparatus of the third aspect of the present invention, when the traveling speed of the vehicle is reduced to the second predetermined vehicle speed or lower within the predetermined time period after the operation for requesting the follow-up control is made by the driver, the adaptive cruise control is terminated and the low-speed following control is started.

Accordingly, even if the operation for switching from the adaptive cruise control to the low-speed following control was made by the driver when the traveling speed of the vehicle is greater than the second predetermined vehicle speed, the low-speed following control is started when the traveling speed of vehicle is reduced to the second predetermined vehicle speed or lower within a predetermined time. Thus, the gap between the control by the apparatus and the driving experience by the driver can be eliminated.

According to the driving control apparatus of the fourth aspect of the present invention, when the traveling speed of the vehicle is not reduce to the second predetermined vehicle speed or lower within the predetermined time period after the operation for requesting the follow-up control is made by the driver, the adaptive cruise control can be continued without starting the low-speed following control.

Accordingly, even if, for example, the low-speed following control is erroneously requested when the vehicle is traveling at a high speed, the adaptive cruise control is continued when the traveling speed of vehicle is not reduce to the second predetermined vehicle speed or lower. Thus, unnecessary switching between the adaptive cruise control and the low-speed following control can be prevented.

According to the driving control apparatus of the fifth aspect of the present invention, when an operation by the driver requesting the follow-up control who is warned by the warning unit is made even when the traveling speed of the vehicle is higher than the second predetermined vehicle speed to switch between the adaptive cruise control and the low-speed following control. Such an operation by the driver is processed as a valid operation and the low-speed following control can be started when the traveling speed of the vehicle is reduced to the second predetermined vehicle speed or lower to start the low-speed following control.

Thus, the adaptive cruise control and the low-speed following control can be properly executed, and it is ensured that the adaptive cruise control can be switched to the low-speed following control by the operation by the driver in a manner which is consistent with the driving experience by the driver.

According to the driving control apparatus of the sixth aspect of the present invention, the driver can be notified in one of the following events: the adaptive cruise control is terminated by a factor other than an operation by the driver; the traveling speed of the vehicle is reduced to the second predetermined vehicle speed or lower during a deceleration control related to the adaptive cruise control; and the inter-vehicle distance between the vehicle and the preceding vehicle is reduced to a predetermined distance or shorter.

Accordingly, it is possible to notify the driver any changes of the traffic conditions surrounding the vehicle and prompt the driver to switch from the adaptive cruise control to the low-speed following control. Thus, it is ensured that the adaptive cruise control is switched to the low-speed following control, and a smooth driving control of the vehicle is achieved.

According to the driving control apparatus of the second aspect of the present invention, when an operation by the driver requesting the follow-up control is detected while the vehicle is traveling at a speed equal to or higher than the first predetermined vehicle speed, the vehicle is made to travel by the adaptive cruise control down to the second predetermined vehicle speed at which the vehicle is not required to be stopped or started following the preceding vehicle while keeping a certain distance from the preceding vehicle. In contrast, when an operation by the driver requesting the follow-up control is detected while the vehicle is traveling at a speed equal to or lower than the third predetermined vehicle speed, the vehicle is made to travel or stop by the adaptive cruise control up to the fourth predetermined vehicle speed at which the vehicle is no more required to be stopped or started following the preceding vehicle.

Thus, a driving control apparatus that can make the vehicle travel smoothly in response to instructions from the driver can be realized by making the vehicle travel following the preceding vehicle utilizing the adaptive cruise control or the low-speed following control while adequately switching between the adaptive cruise control and low-speed following control depending on travel conditions.

According to the driving control apparatus of the eighth aspect of the present invention, the low-speed following control can be terminated and the adaptive cruise control can be started if an operation by the driver requesting the follow-up control is detected the traveling speed of the vehicle is the third predetermined vehicle speed or higher while the low-speed following control is executed even when the traveling speed of the vehicle is the first predetermined vehicle speed or lower.

Accordingly, the gap between the control by the apparatus and the driving experience by the driver can be eliminated, and the vehicle can be adequately made to travel following the preceding vehicle.

According to the driving control apparatus of the ninth aspect of the present invention, the low-speed following control can be terminated and the adaptive cruise control can be started when the traveling speed of the vehicle is increased to the first predetermined vehicle speed or higher if an operation by the driver requesting the follow-up control is detected when the traveling speed of the vehicle is equal to or higher than the third predetermined vehicle speed while the low-speed following control is executed.

Accordingly, the low-speed following control can be terminated and the adaptive cruise control can be started when the traveling speed of the vehicle is increased to the first predetermined vehicle speed at which the adaptive cruise control can be set or higher while responding to operations made by the driver who operates according to the driving experience. Thus, the vehicle can be made to travel following the preceding vehicle while keeping an adequate balance between the driving control made by the apparatus and the driving experience by the driver.

BRIEF DESCRIPTION OF THE DRAWINGS

FIG. 12 is a timing chart illustrating decision-making operations as to whether to start or terminate the adaptive cruise control or the low-speed following control, or to switch between them, made by the driving control apparatus of the above-described embodiment.

DETAILED DESCRIPTION OF THE INVENTION

In the following, various embodiments of the present invention will be explained with reference to the drawings.

Structure

Figure 1:
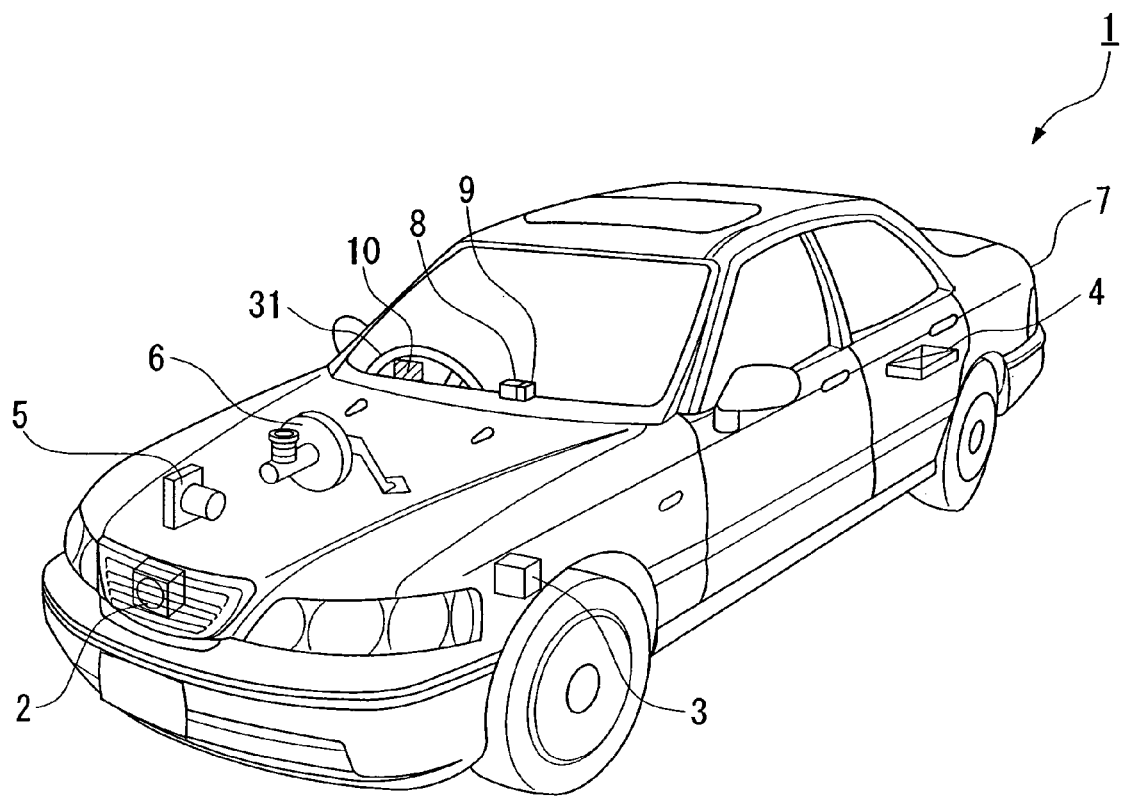
FIG. 1 is a perspective view of a vehicle including a driving control apparatus according to an embodiment of the invention.
Figure 2:
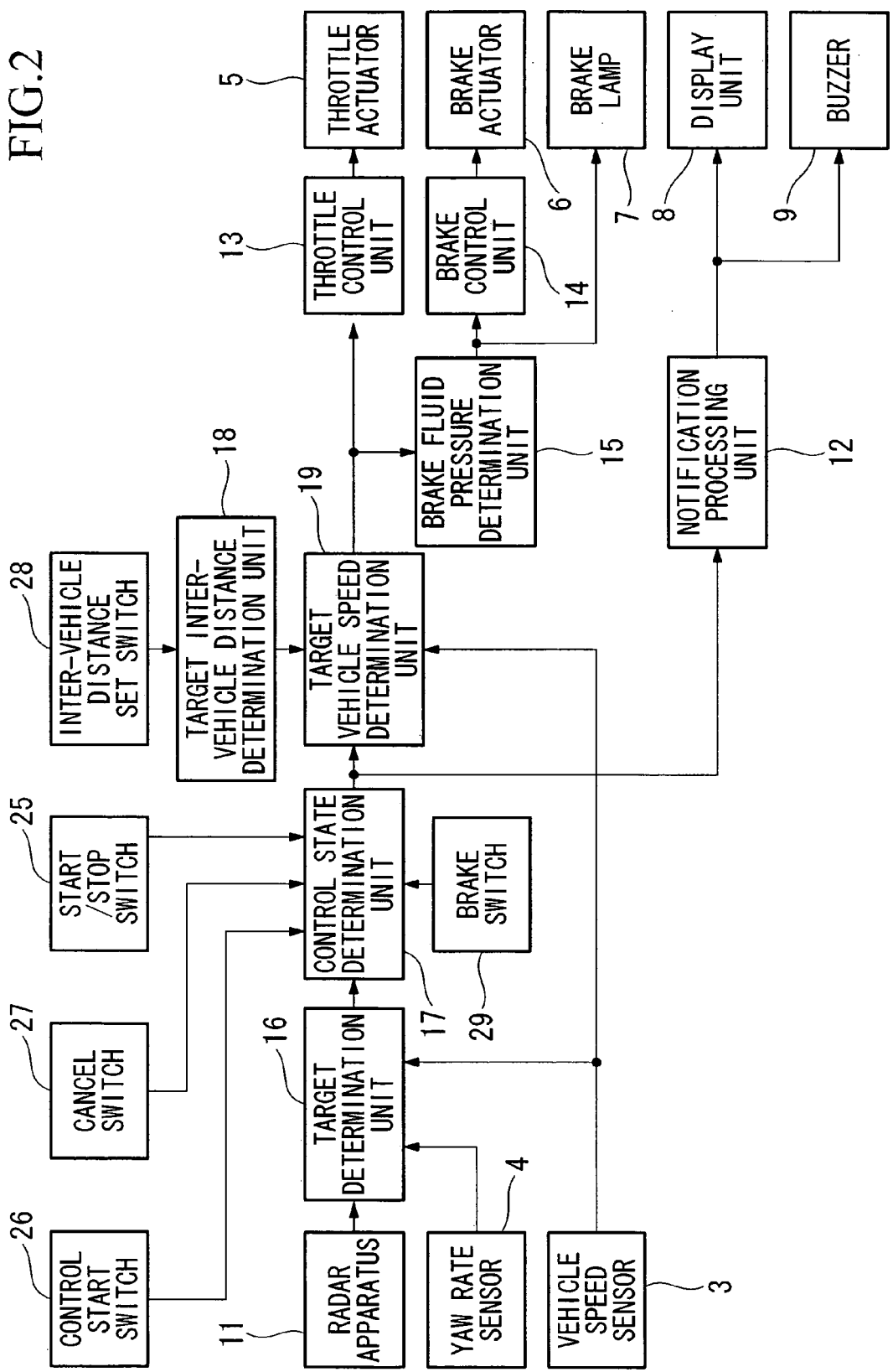
FIG. 2 is a schematic block diagram illustrating a driving control apparatus of the above-described embodiment.

FIG. 1 is a perspective view of a vehicle 1 including a driving control apparatus according to an embodiment of the present invention, and FIG. 2 is a block diagram illustrating the driving control apparatus according to one embodiment of the present invention.

The driving control apparatus of the present embodiment is constructed as a millimeter-wave radar integrated ECU (Electronic Control Unit) 2. The vehicle 1 includes a vehicle speed sensor 3 that detects the vehicle speed of the vehicle 1, and a yaw rate sensor 4 that detects the yaw rate of the vehicle 1. The detected vehicle speed and the yaw rate are input into the millimeter-wave radar integrated ECU2 (driving control apparatus).

Furthermore, a throttle actuator 5 that operates the throttle of an engine of the vehicle 1 by means of fluid pressure and electricity and a brake actuator 6 that similarly operates a brake of the vehicle 1 by fluid pressure and electricity are provided to the vehicle 1.

A brake lamp 7 that indicates the operating states of the brake of the vehicle 1 is provided in the rear of the vehicle 1.

Furthermore, in the vicinity of the cockpit of the vehicle 1, a display unit 8, and a buzzer 9 that notify with the control status of the driving control apparatus to the driver are provided. In the vicinity of the steering wheels 31, switches 10 for receiving driving operations from the driver to the driving control apparatus are provided.

Here, the millimeter-wave radar integrated ECU2 (driving control apparatus) will be explained in detail with reference to FIG. 2. Reference numeral 11 denotes a radar apparatus of the millimeter-wave radar integrated ECU 2, provided in the front of the vehicle 1. The radar apparatus transmits a radar wave around the vehicle 1, and receives a reflected wave of the radar wave reflected by an object. The radar apparatus 11 uses the received reflected wave to detect objects that are present before the vehicle 1.

The driving control apparatus of the present embodiment also includes as processing units embodied in the ECU portion of the millimeter wave radar integrated ECU 2 having a CPU (central processing unit). Such processing units include an notification processing unit 12, a throttle control unit 13, a brake control unit 14, a brake fluid pressure determination unit 15, a target determination unit 16, a control state determination unit 17, a target inter-vehicle distance determination unit 18, and a target vehicle speed determination unit 19.

The notification processing unit 12 is a processing unit that notifies the control status of driving control apparatus to the driver by means of the display unit 8 and/or the buzzer 9 in the vicinity of the cockpit. The notification processing unit 12 also includes warning means to give a warning to the driver. In addition, the warning may be a beep of alarm sound, or an illumination of an indicator lamp that indicates a warning, for example.

The throttle control unit 13 is a processing unit that controls the throttle actuator 5 that sets the degree of throttle opening (throttle position) for operating the throttle of the engine of the vehicle 1.

The brake control unit 14 is a processing unit that controls the brake actuator 6 for operating the brake of the vehicle 1. The control by the brake control unit 14 is executed based on the target fluid pressure (hydraulic pressure) of the brake fluid that is determined by the brake fluid pressure determination unit 15. The turning of on and off of the brake lamp 7 that is installed in the rear of the vehicle 1 is controlled based on the target fluid pressure of the brake fluid that is determined by the brake fluid pressure determination unit 15.

The target determination unit 16 is a processing unit that processes information on objects that are present ahead of the vehicle 1 and is detected by the radar apparatus 11. The target determination unit 16 includes a driving route calculating processing unit that calculates driving route of the vehicle (vehicle driving route) using the vehicle speed determined by the vehicle speed sensor 3 and the yaw rate of the vehicle 1 determined by yaw rate sensor 4. The target determination unit 16 includes the preceding vehicle determination unit that detects a preceding vehicle that the vehicle 1 follows based on the calculated vehicle driving route and information, which is received from the radar apparatus 11, on the objects that are detected present ahead of the vehicle 1, and calculates the object information on the detected preceding vehicle and the distance and the relative speed between the preceding vehicle and the vehicle 1.

For example, the target determination unit 16 determines the radius (R) of a corner of the road on which the vehicle 1 is traveling, and determines the route of the vehicle by dividing the traveling speed of the vehicle 1 by the yaw rate of the vehicle 1. The target determination unit 16 detects static objects, such as a reflector and a white line along the sides of a traffic lane, and distinguishes a preceding vehicle on the traffic lane along which the vehicle 1 is traveling and vehicles on adjacent traffic lanes. When the vehicle 1 stops, the target determination unit 16 distinguishes the preceding vehicle and other vehicles by utilizing the route of the vehicle until the vehicle stops.

The control state determination unit 17 is a processing unit that executes driving control based on a signal from switches 10 (including a start/stop switch 25 for receiving request to start or stop the vehicle 1 from the driver, or the control start switch 26 for receiving an request to start of the follow-up control, or a cancel switch 27 for receiving an request to cancel the follow-up control) that are configured to input driving operations from the driver, a signal from a brake switch 29 that is installed in the brake pedal and indicates a control status of the brake pedal operated by the driver, and the object information that it is received from target determination unit 16. The control state determination unit 17 controls the driving control of the vehicle 1 by state transition among states A:OFF, B:FOLLOW-UP, and C:STOP HOLD and notifies a control state to driver by means of the notification processing unit 12. The state transition of the driving control of the vehicle 1 in the control state determination unit 17 will be described in detail later.

The target inter-vehicle distance determination unit 18 is a processing unit that determines a target inter-vehicle distance between the vehicle 1 and the preceding vehicle based on operation of one of the switches 10 that are configured to receive driving operations from the driver, an inter-vehicle distance set switch 28, the target inter-vehicle distance being controlled by the driving control apparatus of the present embodiment. The target vehicle speed determination unit 19 calculates optimal traveling speed of the vehicle 1 based on the control state determined by the control state determination unit 17 and the determined target inter-vehicle distance determined by the target inter-vehicle distance determination unit 18, and controls the throttle control unit 13 and the brake fluid pressure determination unit 15 so that the vehicle 1 travels at this target vehicle speed.

More specifically, when the target vehicle speed is greater than the present traveling speed of the vehicle 1, the target vehicle speed determination unit 19 instructs the throttle actuator 5 to increase the degree of the throttle opening that is output by the throttle control unit 13 so that the number of revolutions of the engine is increased to accelerate the vehicle. In contrast, when the target vehicle speed is lower than the present traveling speed of the vehicle 1, the target vehicle speed determination unit 19 instructs the brake actuator 6 to increase the target fluid pressure of the break fluid that is output by the brake fluid pressure determination unit 15 so that the brake control unit 14 applies the brake.

Figure 3:
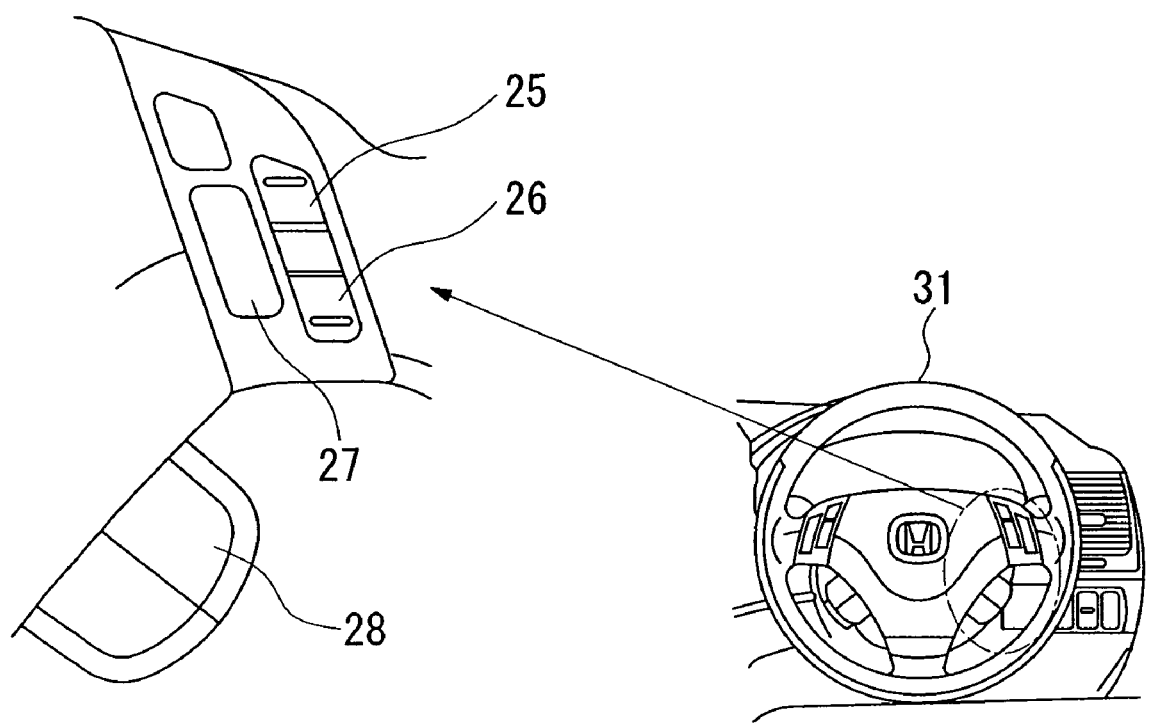
FIG. 3 illustrates an exemplary layout of a start/stop switch, a control start switch, and a cancel switch, and an inter-vehicle distance set switch of above-described embodiment.

FIG. 3 illustrates an exemplary layout of the start/stop switch 25, the control start switch 26, and the cancel switch 27, and the inter-vehicle distance set switch 28 described above. These switches are positioned near the steering wheel 31 for the convenience of the driver. The start/stop switch 25, the control start switch 26, the cancel switch 27, and the inter-vehicle distance set switch 28 may function as operating switches of a cruise control apparatus that is equipped in the vehicle 1.

First Embodiment

Control State Transition

The state transition of driving control states in the control state determination unit 17 according to the first embodiment will be described with reference to the drawings.

Figure 4:
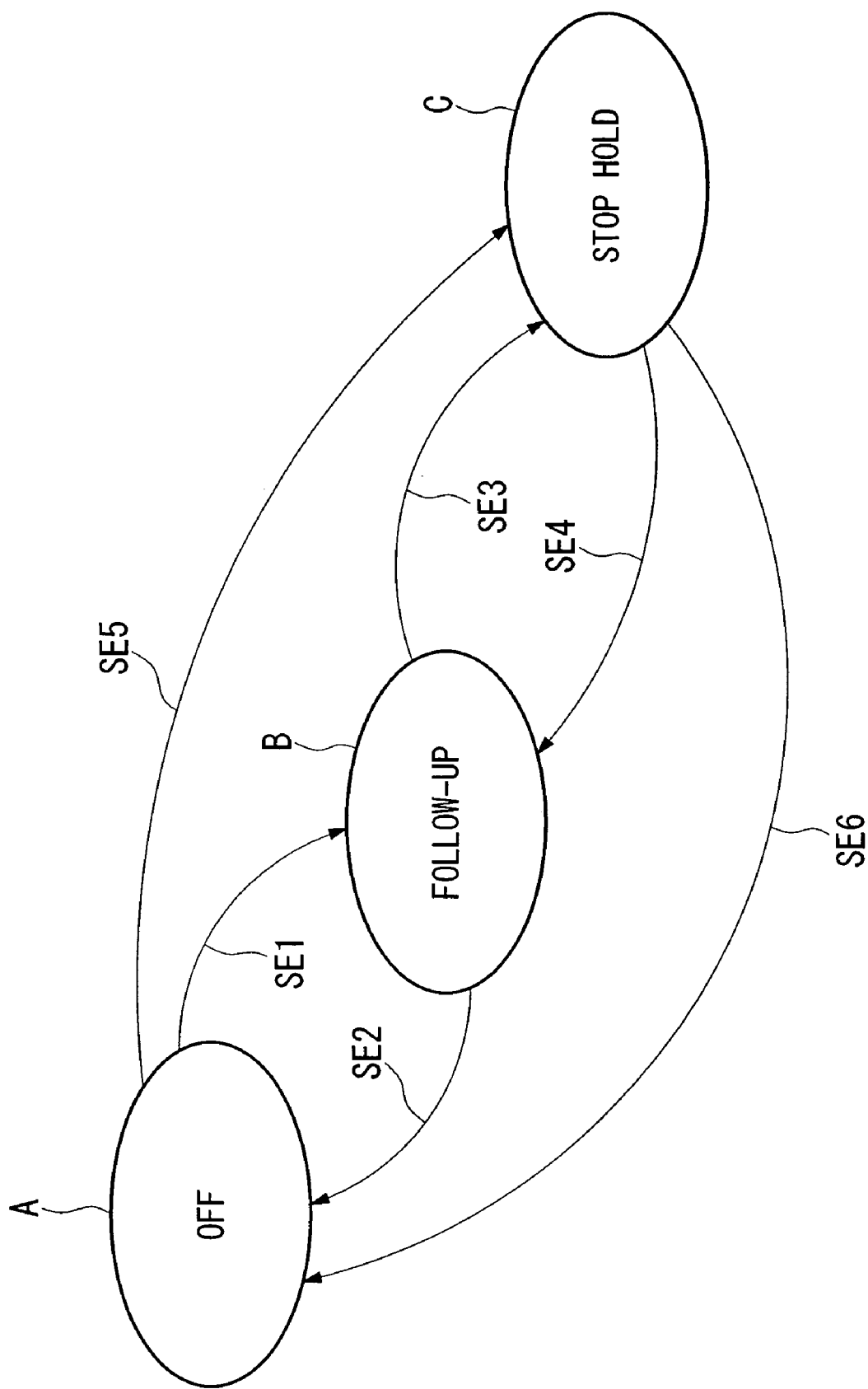
FIG. 4 is a figure which shows state transition of driving control in control state determination unit of driving control apparatus of the above-described embodiment.

FIG. 4 is a state diagram of driving control states in the control state determination unit 17.

In FIG. 4, as described previously, the driving control states are included of three states: A:OFF, B:FOLLOW-UP, and C:STOP HOLD. Among them, in the A:OFF state, the driving control by the driving control apparatus is not executed. In the B:FOLLOW-UP state, the driving control by the driving control apparatus is executed. In the C:STOP HOLD state, after the preceding vehicle that the vehicle 1 follows stops, the vehicle 1 stops following the preceding vehicle, and remains stopped.

The control state determination unit 17 causes a driving control state to be transitioned in response to various inputs described below, as shown in FIG. 4.

First, in the A:OFF driving control state, if the driver depresses the control start switch 26 while the preceding vehicle that the vehicle 1 follows is detected, the control state determination unit 17 transitions the driving control state from the A:OFF state to the B:FOLLOW-UP state (state transition SE1).

In contrast, in the B:FOLLOW-UP driving control state, if the driver depresses the cancel switch 27 or presses the brake pedal, the control state determination unit 17 transitions the driving control state from the B:FOLLOW-UP state to the A:OFF state (state transition SE2).

Furthermore, in the B:FOLLOW-UP driving control state, if the preceding vehicle is stopped and the vehicle stops in a predetermined position behind the preceding vehicle, the control state determination unit 17 transitions the driving control state from the B:FOLLOW-UP state to the C:STOP HOLD state (state transition SE3).

Furthermore, in the C:STOP HOLD driving control state, if the driver depresses the start/stop switch 25 or presses the accelerator pedal, the control state determination unit 17 transitions the driving control state from the C:STOP HOLD state to the B:FOLLOW-UP state (state transition SE4).

In contrast, in the A:OFF driving control state, if the driver depresses the control start switch 26 when the preceding vehicle that the vehicle 1 follows is stopped and the vehicle 1 stops behind the preceding vehicle, the control state determination unit 17 transitions the driving control state directly from the A:OFF state to the C:STOP HOLD state (state transition SE5).

Furthermore, in the C:STOP HOLD driving control state, if the driver depresses the cancel switch 27 or presses the brake pedal, the control state determination unit 17 transitions the driving control state directly from the C:STOP HOLD state to the A:OFF state (state transition SE6).

Description of B:FOLLOW-UP State

The B:FOLLOW-UP state in the above-described driving control will be described in detail. The above-described B:FOLLOW-UP state in the driving control has two states. One is a state in which an adaptive cruise control (ACC) is executed in which the vehicle 1 is made to travel while keeping a certain inter-vehicle distance between the vehicle 1 and the preceding vehicle when the vehicle 1 and the preceding vehicle travel at a speed at which the vehicle 1 is not required to be stopped or started following the preceding vehicle. The other is a state in which a low-speed following (LSF) control is executed in which the vehicle 1 is made to travel or stop following the preceding vehicle when the vehicle 1 and the preceding vehicle travel at a speed at which the vehicle 1 is required to be stopped or started following the preceding vehicle. In other words, the state transition between the B:FOLLOW-UP state and the C:STOP HOLD state occurs when the low-speed following (LSF) control is executed.

Figure 5:
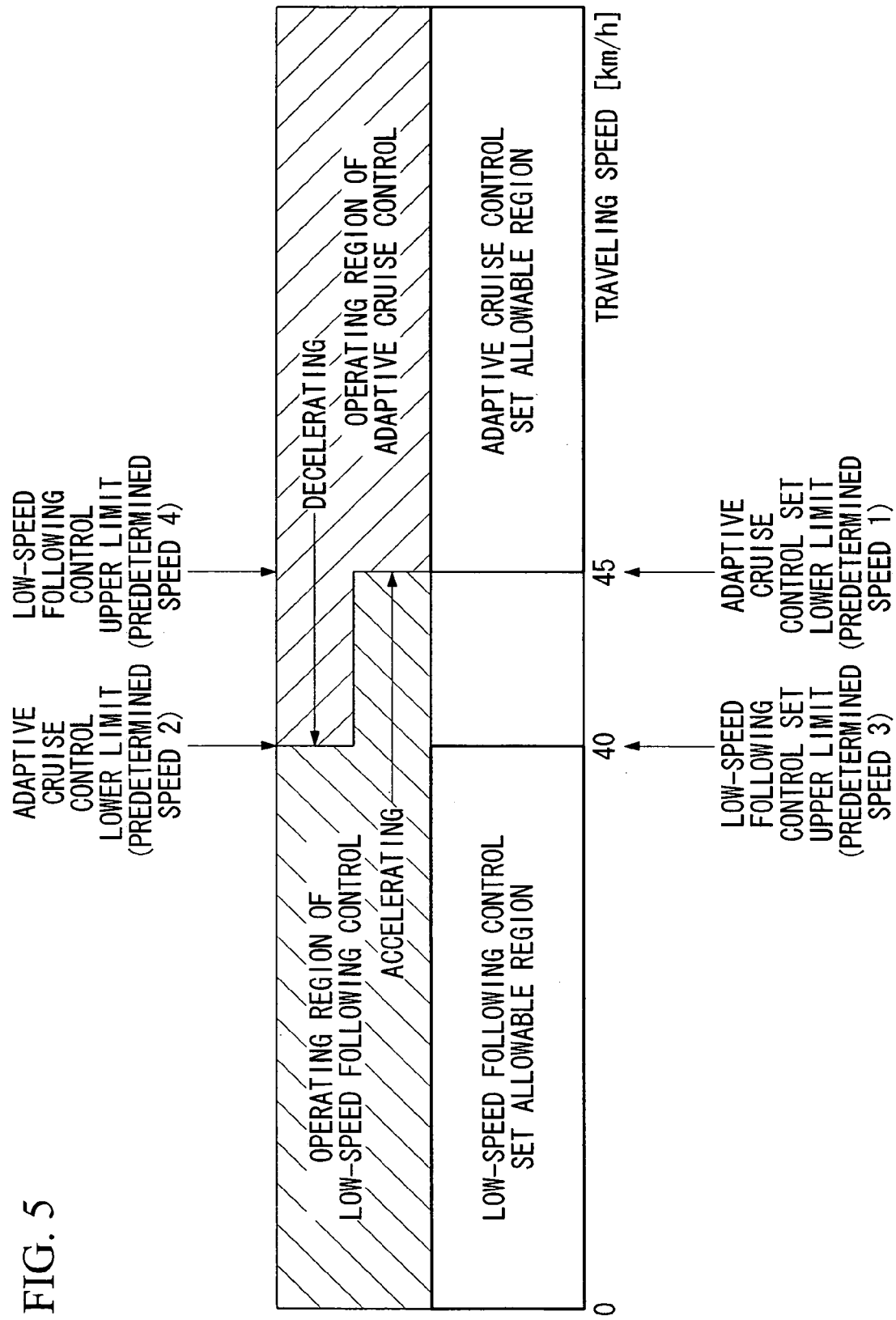
FIG. 5 is a diagram illustrating the vehicle speed regions for executing either the adaptive cruise control or the low-speed following control according to the driving control apparatus of the above-described embodiment.

The switching between the adaptive cruise control (ACC) and the low-speed following (LSF) control will be explained in detail with reference to FIG. 5. FIG. 5 is a diagram illustrating traveling speed regions for executing the adaptive cruise control (ACC) and the low-speed following (LSF) control. In FIG. 5, the horizontal axis indicates the traveling speed of the vehicle 1. This diagram shows the relationship between regions of the traveling speed of the vehicle 1 and the executed corresponding control mode (ACC or LSF), and the speed limits at which the modes are switched. More specifically, as shown in FIG. 5, in the region in which the traveling speed of the vehicle 1 is equal to or lower than a predetermined speed 3 (for example, 40 km/h), the low-speed following (LSF) control can be set (i.e., the low-speed following control set allowable region). Furthermore, in the region in which the traveling speed of the vehicle 1 is equal to or higher than a predetermined speed 1 (for example, 45 km/h), the adaptive cruise control (ACC) can be set (i.e., adaptive cruise control set allowable region).

When the traveling speed of the vehicle 1 is increased to the predetermined speed 4 (for example, 45 km/h) or higher while the low-speed following (LSF) control is executed, the low-speed following (LSF) control is continued and the traveling speed of the vehicle 1 is controlled so that it does not exceed the predetermined speed 4 (for example, 45 km/h). Furthermore, when the traveling speed of the vehicle 1 is reduced to the predetermined speed 2 (for example, 40 km/h) or lower while the adaptive cruise control (ACC) is executed, the adaptive cruise control (ACC) is automatically terminated. However, the low-speed following (LSF) control is not started unless the adaptive cruise control is explicitly instructed by the depression of the control start switch 26 by the driver. In this case, the driver manually drives. When the follow-up control is requested by the depression of the control start switch 26 by the driver while the adaptive cruise control (ACC) is executed, the low-speed following (LSF) control is started when the traveling speed of vehicle 1 is reduced to the predetermined speed 2 (for example, 40 km/h) or lower, which will be described below in detail.

In other words, the predetermined speed 1 (for example, 45 km/h) is the lower speed limit to set the adaptive cruise control (ACC).

The predetermined speed 2 (for example, 40 km/h) is the lower speed limit to execute the adaptive cruise control (ACC).

Furthermore, the predetermined speed 3 (for example, 40 km/h) is the upper speed limit to set the low-speed following (LSF) control.

The predetermined speed 4 (for example, 45 km/h) is the upper speed limit to execute the low-speed following (LSF) control. Start, Termination, and Switching Operations of Adaptive Cruise Control Next, decision-making operations as to whether to start or terminate the adaptive cruise control (ACC) or the low-speed following control (LSF), or to switch between them, made by the control state determination unit 17 will be described with reference to the drawings.

Figure 6:
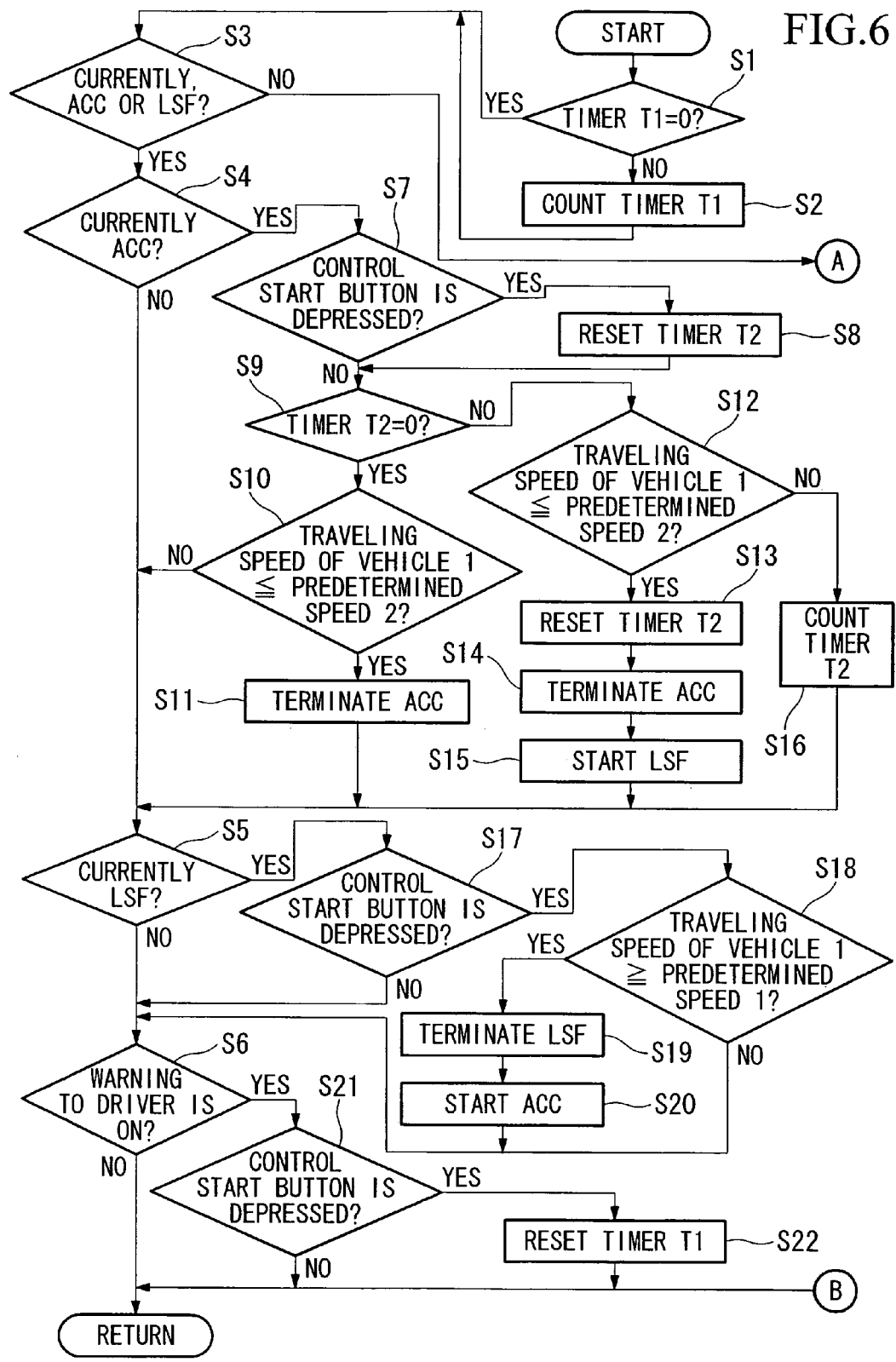
FIG. 6 is a flowchart illustrating decision-making operations as to whether to start or terminate the adaptive cruise control or the low-speed following control, or to switch between them, made by the driving control apparatus of the above-described embodiment.
Figure 7:
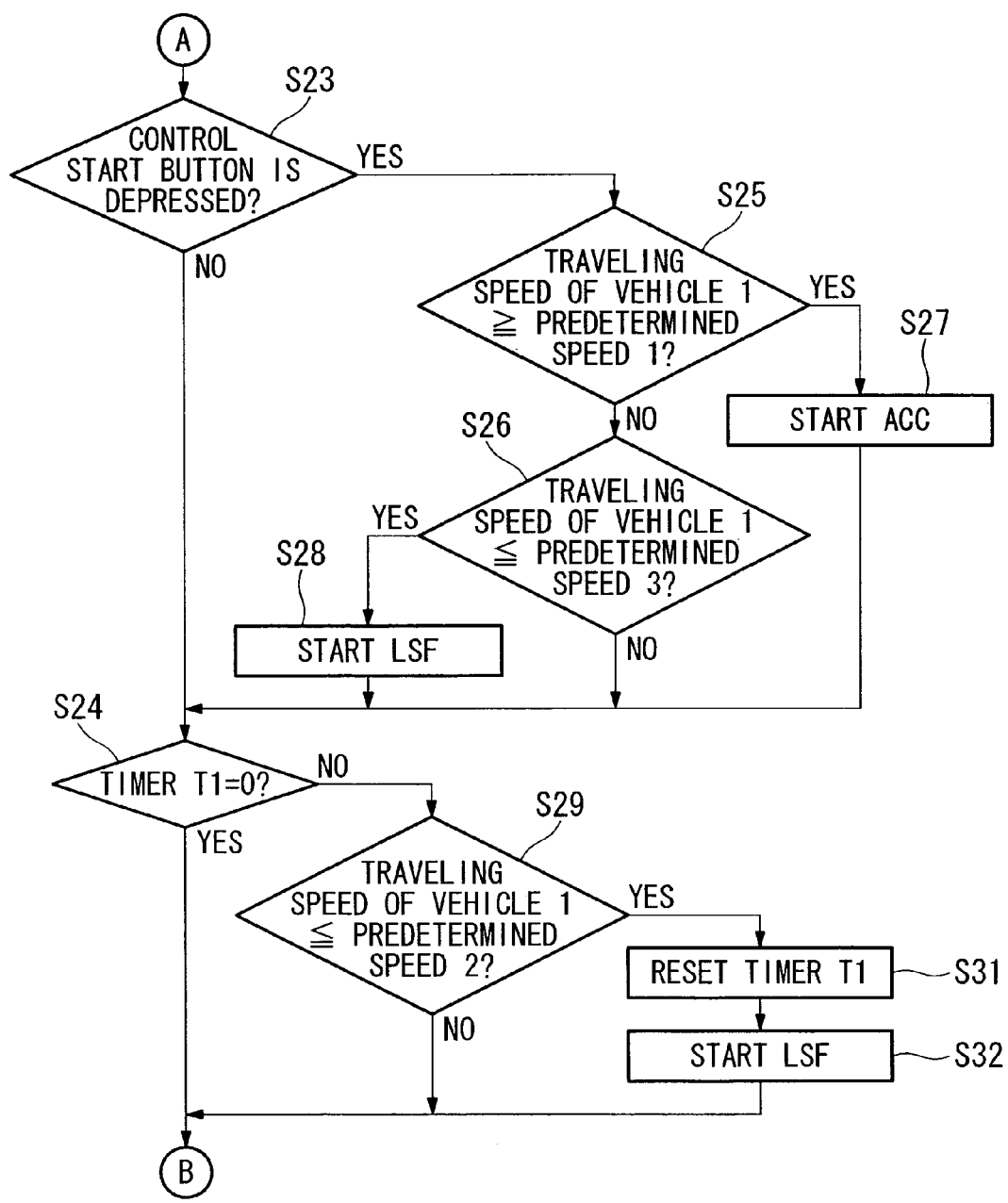
FIG. 7 is a flowchart illustrating decision-making operations as to whether to start or terminate the adaptive cruise control or the low-speed following control, or to switch between them, made by the driving control apparatus of the above-described embodiment.

Referring to flowcharts in FIGS. 6 and 7, decision-making operations as to whether to start or terminate the adaptive cruise control (ACC) or the low-speed following control (LSF), or to switch between them will be described. FIGS. 6 and 7 are flowcharts illustrating decision-making operations as to whether to start or terminate the adaptive cruise control (ACC) or the low-speed following (LSF) control, or to switch between them, made by the control state determination unit 17. The control state determination unit 17 regularly starts the processing shown in FIGS. 6 and 7.

In FIG. 6, the control state determination unit 17 is started regularly, and it determines whether or not the value of a timer T1 for monitoring any operation of the control start switch 26 by the driver is "0" (Step S1).

When the value of the timer T1 is not "0" in step S1 (i.e., NO of step S1), the control state determination unit 17 starts to count the timer T1 for monitoring any operation of the control start switch 26 by the driver by decrementing the timer 1 (step S2).

Then, the control state determination unit 17 determines whether or not the adaptive cruise control (ACC) or the low-speed following (LSF) control is currently executed on the preceding vehicle (step S3).

In contrast, when the value of the timer T1 is "0" in Step S1 (i.e., YES in Step S1), the control state determination unit 17 proceeds to Step S3 without executing any processing, and a determination is made as to whether or not the adaptive cruise control (ACC) or the low-speed following (LSF) control is currently executed on the preceding vehicle (step S3).

When it is determined that the adaptive cruise control (ACC) or the low-speed following (LSF) control is currently executed for the preceding vehicle in Step S3 (i.e., YES in Step S3), the control state determination unit 17 determines whether or not the current driving control is the adaptive cruise control (ACC) on the preceding vehicle (Step S4).

Then, when it is determined that the current driving control is not the adaptive cruise control (ACC) on the preceding vehicle in Step S4 (i.e., NO in Step S4), the control state determination unit 17 determines whether or not the current driving control is the low-speed following (LSF) control (Step S5).

Furthermore, when it is determined that the current driving control is not the low-speed following (LSF) control on the preceding vehicle in Step S5, (i.e., NO in Step S5), the control state determination unit 17 determines whether or not the warning to the driver is turned on by the warning means of the notification processing unit 12 (Step S6).

When the warning to the driver by the warning means is not turned on in Step S6 (i.e., NO in Step S6), the control state determination unit 17 finishes the current decision-making operation without executing any processing.

The warning means issues a warning to the driver in the following three cases: (1) when the adaptive cruise control (ACC) is cancelled other factors than an operation by the driver; or (2) when the traveling speed of the vehicle 1 is reduced to the predetermined speed 2 (for example, 40 km/h) or lower during a deceleration control related to the adaptive cruise control (ACC); or (3) when the inter-vehicle distance between the vehicle 1 and the preceding vehicle is reduced to a predetermined distance or smaller.

When it is determined that the current driving control is adaptive cruise control on the preceding vehicle (ACC) on the preceding vehicle in Step S4 (i.e., YES in Step S4), the control state determination unit 17 determines whether or not the control start switch 26 has been depressed by the driver, in other words, whether or not an output signal of the control start switch 26 has been changed from OFF to ON (Step S7).

When it is determined that the control start switch 26 has been depressed by the driver, in other words, the output signal of the control start switch 26 has been changed from OFF to ON in Step S7 (i.e., YES in Step S7), the control state determination unit 17 sets the timer T2 for monitoring the traveling speed of the vehicle 1 to two seconds, for example (Step S8), and monitors the traveling speed of the vehicle 1 to determine whether or not it becomes the predetermined speed 2 (for example, 40 km/h) or lower during one cycle (two seconds) of the timer T2.

After the timer T2 is set in Step S8, or when the control start switch 26 has not been depressed by the driver, in other words, when the output signal of the control start switch 26 has not been changed from OFF to ON in Step S10 (i.e., NO in Step S7), the control state determination unit 17 determines whether or not the value of the timer T2 for monitoring the traveling speed of the vehicle 1 is "0" (Step S9).

When the value of the timer T2 is "0" in Step S9 (i.e., YES in Step S9), the control state determination unit 17 determines that the traveling speed of the vehicle 1 is the predetermined speed 2 (for example, 40 km/h) or lower in Step 10 (Step S10).

When it is determined that the traveling speed of the vehicle 1 is not the predetermined speed 2 (for example, 40 km/h) or lower in Step 10 (i.e., NO in Step S10), the control state determination unit 17 proceeds to Step S5 without executing any processing.

In contrast, when it is determined that the traveling speed of the vehicle 1 is the predetermined speed 2 (for example, 40 km/h) or lower in Step S10 (i.e., YES in Step S10), the control state determination unit 17 terminates the adaptive cruise control (ACC) (Step S11), and proceeds to Step S5.

Furthermore, when the value of the timer T2 is not "0" in Step S9 (i.e., NO in Step S9), the control state determination unit 17 determines that the traveling speed of the vehicle 1 is the predetermined speed 2 (for example, 40 km/h) or lower (Step S112).

When it is determined that that the traveling speed of the vehicle 1 is the predetermined speed 2 (for example, 40 km/h) or lower in Step S12 (i.e., YES in Step S112), the control state determination unit 17 resets the value of the timer T2 to "0" (Step S13).

Then, the control state determination unit 17 terminates the adaptive cruise control (ACC) on the preceding vehicle (Step S14), starts the low-speed following (LSF) control (Step S15), and proceeds to Step S5.

In contrast, when it is determined that that the traveling speed of the vehicle 1 is not the predetermined speed 2 (for example, 40 km/h) or lower in Step S12 (i.e., NO in Step S12), the control state determination unit 17 starts to count the timer T2 by decrementing the timer T2 (step S15) and proceeds to Step S5.

Furthermore, when the current driving control is the low-speed following (LSF) control on the preceding vehicle in Step S5 (i.e., YES in Step S5), the control state determination unit 17 determines whether or not the control start switch 26 has been depressed by the driver, in other words, whether or not an output signal of the control start switch 26 has been changed from OFF to ON (Step S17).

When it is determined that the control start switch 26 has not been depressed by the driver, in other words, the output signal of the control start switch 26 has not been changed from OFF to ON in Step S17 (i.e., NO in Step S17), the control state determination unit 17 proceeds to Step S6 without executing any processing.

Furthermore, when it is determined that the control start switch 26 has been depressed by the driver, in other words, the output signal of the control start switch 26 has been changed from OFF to ON in Step S17 (i.e., YES in Step S17), the control state determination unit 17 determines whether or not the traveling speed of the vehicle 1 is the predetermined speed 1 (for example, 45 km/h) or higher (Step S18).

When it is determined that the traveling speed of the vehicle 1 is not the predetermined speed 1 (for example, 45 km/h) or higher in Step 18 (i.e., NO in Step S118), the control state determination unit 17 proceeds to Step S6 without executing any processing.

In contrast, it is determined that the traveling speed of the vehicle 1 is the predetermined speed 1 (for example, 45 km/h) or higher in Step 18 (i.e., YES in Step S18), the control state determination unit 17 terminates the low-speed following (LSF) control on the preceding vehicle (Step S119), starts the adaptive cruise control (ACC) (Step S20), and proceeds to Step S6.

Furthermore, when the warning to the driver by the warning means is turned on in Step S6 (i.e., YES in Step S6), the control state determination unit 17 determines whether or not the control start switch 26 has been depressed by the driver, in other words, whether or not an output signal of the control start switch 26 has been changed from OFF to ON (Step S21).

When it is determined that the control start switch 26 has not been depressed by the driver, in other words, the output signal of the control start switch 26 has not been changed from OFF to ON in Step S21 (i.e., NO in Step S21), the control state determination unit 17 finishes the current decision-making operation without executing any processing.

Furthermore, it is determined that the control start switch 26 has been depressed by the driver, in other words, the output signal of the control start switch 26 has been changed from OFF to ON in Step S21 (i.e., YES in Step S21), the control state determination unit 17 sets the other timer T1 for monitoring any operation of the control start switch 26 by the driver to two seconds (Step S22), and finishes the current decision-making operation. In addition, the control state determination unit 17 monitors whether or not the driver depresses the control start switch 26 during one cycle of the timer T1 (two seconds) to turn on the control start switch 26.

In contrast, when it is determined that neither the adaptive cruise control (ACC) nor the low-speed following (LSF) control is currently executed on the preceding vehicle in the above-described Step S3 (i.e., NO in Step S3), the control state determination unit 17 proceeds to Step S23 of FIG. 7, in which it is determined whether or not the control start switch 26 has been depressed by the driver, in other words, whether or not an output signal of the control start switch 26 has been changed from OFF to ON (Step S23).

When it is determined that the control start switch 26 has not been depressed by the driver, in other words, the output signal of the control start switch 26 has not been changed from OFF to ON in Step S23 (i.e., NO in Step S23), the control state determination unit 17 determines whether or not the value of the timer T1 for monitoring any operation of the control start switch 26 by the driver is "0" (Step S24).

When the value of the timer T1 is "0" in Step S24 (i.e., YES in Step S24), the control state determination unit 17, the control state determination unit 17 finishes the current decision-making operation without executing any processing.

Furthermore, when it is determined that the control start switch 26 has been depressed by the driver, in other words, the output signal of the control start switch 26 has been changed from OFF to ON in Step S23 (i.e., YES in Step S23), the control state determination unit 17 determines whether or not the vehicle speed of the vehicle 1 is the predetermined speed 1 (for example, 45 km/h) or higher (Step S25).

When the vehicle speed of the vehicle 1 is not the predetermined speed 1 (for example, 45 km/h) or higher in Step S25 (i.e., NO in Step S25), the control state determination unit 17 determines whether or not the vehicle speed of the vehicle 1 is the predetermined speed 3 (for example, 40 km/h) (Step S26) or lower.

When it is determined that the traveling speed of the vehicle 1 is not the predetermined speed 3 (for example, 40 km/h) or lower in Step 26 (i.e., NO in Step S26), the control state determination unit 17 proceeds to Step S24 without executing any processing.

In contrast, when the vehicle speed of the vehicle 1 is the predetermined speed 1 (for example, 45 km/h) or higher in Step S25 (i.e., YES in Step S25), the control state determination unit 17 starts the adaptive cruise control (ACC) (Step S27) and proceeds to Step S24.

Furthermore, when it is determined that the traveling speed of the vehicle 1 is the predetermined speed 3 (for example, 40 km/h) or lower in Step 26 (i.e., NO in Step S26), the control state determination unit 17 starts the low-speed following (LSF) control (Step S28) and proceeds to Step S24.

Furthermore, when the value of timer T1 is not "0" in Step S24 (i.e., NO in Step S24), the control state determination unit 17 determines whether or not the traveling speed of the vehicle 1 is the predetermined speed 2 (for example, 40 km/h) or lower (Step S29).

When it is determined that the traveling speed of the vehicle 1 is not the predetermined speed 2 (for example, 40 km/h) or lower in Step S29 (i.e., NO in Step S29), the control state determination unit 17 finishes decision-making operation in this time.

Furthermore, when it is determined that that the traveling speed of the vehicle 1 is the predetermined speed 2 (for example, 40 km/h) or lower in Step S29 (i.e., YES in Step S29), the control state determination unit 17 resets the value of timer T1 to "0" (Step S31).

Then, the control state determination unit 17 starts the low-speed following (LSF) control on the preceding vehicle (Step S32), and finishes the current decision-making operation without executing any processing.

Figure 8:
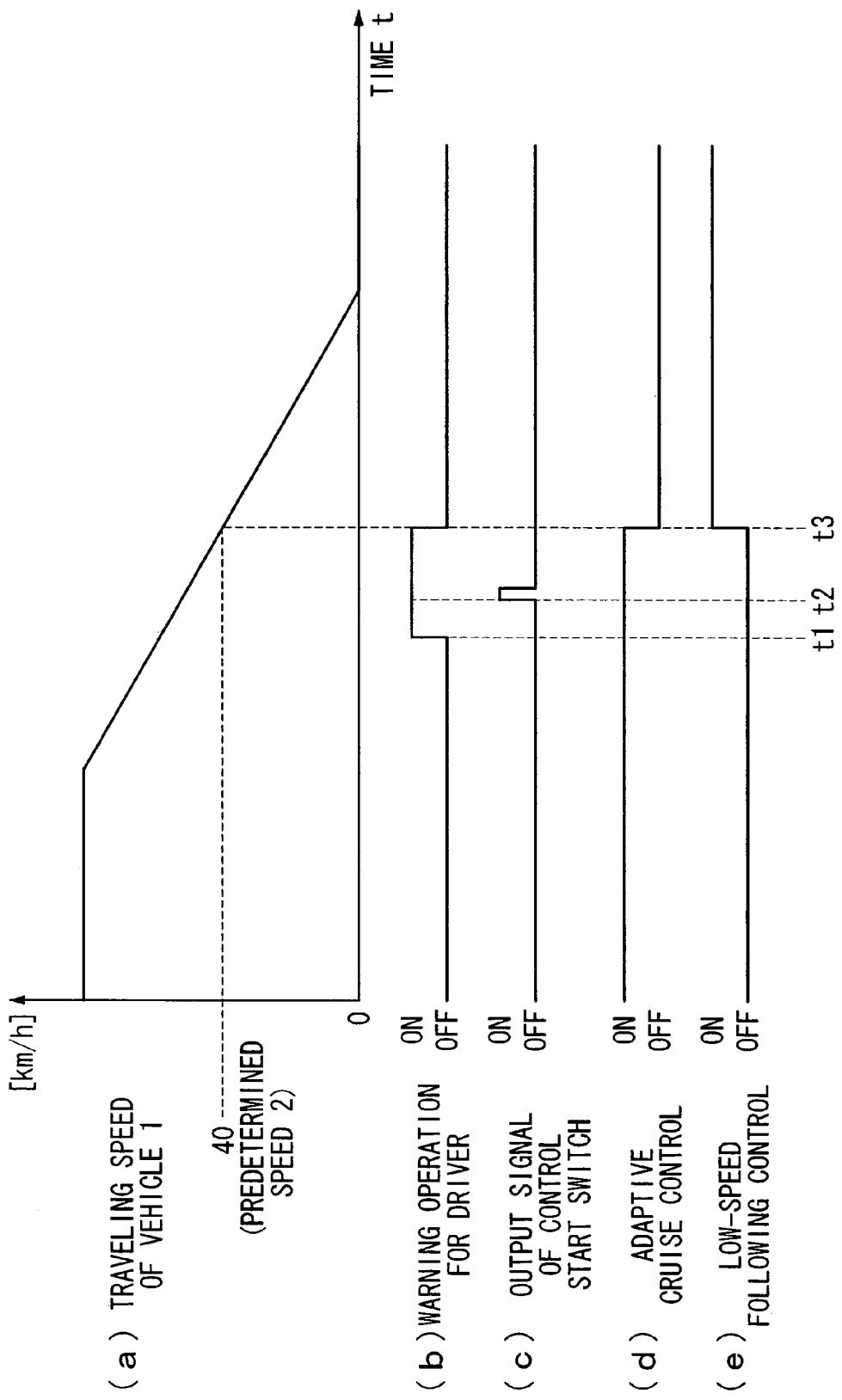
FIG. 8 is a timing chart illustrating decision-making operations as to whether to start or terminate the adaptive cruise control or the low-speed following control, or to switch between them, made by the driving control apparatus of another embodiment.

Furthermore, the decision-making operation as to switch between the adaptive cruise control (ACC) and the low-speed following (LSF) control will be described more concretely with reference to a timing chart. FIG. 8 is a timing chart that shows decision-making operation as to switch between the adaptive cruise control (ACC) and the low-speed following (LSF) control made by the control state determination unit 17 of the driving control apparatus of the present embodiment. When the driver has been notified as illustrated in (b) WARNING OPERATION FOR DRIVER since the time t1 in FIG. 8 and the output signal became ON in response to the depression of the control start switch 26 by the driver at the time t2 as indicated by (c) INPUT SIGNAL OF CONTROL START SWITCH 26, (d) the control state determination unit 17 terminates (c) ADAPTIVE CRUISE CONTROL (ACC) and starts (e) LOW-SPEED FOLLOWING (LSF) CONTROL at the time t3 when (a) TRAVELING SPEED OF VEHICLE 1 is reduced to the predetermined speed 2 (for example, 40 km/h) or lower. Furthermore, the control state determination unit 17 stops warning the driver as indicated by the (b) WARNING OPERATION FOR DRIVER at the time t3.

It should be noted that, as the criteria for decision-making operations as to whether to start or terminate the adaptive cruise control (ACC) or the low-speed following (LSF) control, or to switch between them, made by the control state determination unit 17, the predetermined speed 1 is 45 km/h, for example, and the predetermined speed 3 is 40 km/h, for example in the embodiment described above. However, the predetermined speed 1 and the predetermined speed 3 can be set to any values provided that the predetermined speed 1 is greater than the predetermined speed 3. Furthermore, the predetermined speed 1 can be set to any value provided that the predetermined speed 1 is equal to or lower than the predetermined speed 4. Similarly, the predetermined speed 2 can be set to any value provided that the predetermined speed 2 is equal to or lower than the predetermined speed 3.

In the embodiment described above, if the driver depresses the control start switch 26 to turn on the control start switch 26 while the warning means issue a warning to the driver, the control state determination unit 17 makes the vehicle 1 travel or stop when the vehicle speed of the vehicle 1 is decreased to the predetermined speed 1 (for example, 40 km/h). However, the low-speed following (LSF) control may be started immediately after the driver depresses the control start switch 26 to turn on the control start switch 26 while the warning means issue a warning to the driver.

As described previously, the driving control apparatus of the present embodiment includes a radar apparatus 11, and determines a preceding vehicle that the vehicle 1 follows among detected objects and executes the adaptive cruise control on the detected preceding vehicle.

The control state determination unit 17 executes the adaptive cruise control (ACC) to make the vehicle 1 travel following the preceding vehicle at a traveling speed greater than the predetermined rate 2 (for example, 40 km/h) when the driver depresses the control start switch 26 to turn on the control start switch 26 while the vehicle 1 travels at a speed higher than the predetermined speed 1 (for example, 45 km/h).

In contrast, the control state determination unit 17 executes the low-speed following (LSF) control to make the vehicle 1 travel or stop following the preceding vehicle when the driver depresses the control start switch 26 to turn on the control start switch 26 while the vehicle 1 travels at a speed equal to or lower than the predetermined speed 3 (for example, 45 km/h).

Thus, the adaptive cruise control (ACC) is executed in which the vehicle 1 is made to travel following the preceding vehicle while keeping a certain distance from the preceding vehicle down to the predetermined speed 2 (for example, 40 km/h) at which the vehicle 1 is not required to be stopped or started following the preceding vehicle when the driver requests the follow-up control while the vehicle 1 travels at a speed equal to or higher than the predetermined speed 1 (for example, 45 km/h). In contrast, the low-speed following (LSF) control is executed in which the vehicle 1 is made to travel or stop following the preceding vehicle up to the predetermined speed 1 (for example, 45 km/h) when the driver requests the follow-up control while the vehicle 1 travels at a speed equal to or lower than the predetermined speed 3 (for example, 40 km/h) at which the vehicle 1 is required to be stopped or started following the preceding vehicle.

By this, since the switching of the driving control modes is executed based on the vehicle speed of the vehicle 1 when the control start switch 26 is depressed, the driving control modes can be switched using a single switch, which enables improvement of the usability and reduction in the cost. In addition, the vehicle 1 can be travel adequately by making the vehicle travel following a preceding vehicle employing between the adaptive cruise control (ACC) or the low-speed following (LSF) control while switching between the adaptive cruise control (ACC) and the low-speed following (LSF) control depending on travel conditions.

In addition, when the traveling speed of the vehicle 1 is reduced to the predetermined speed 2 (for example, 40 km/h) or lower within a predetermined time period after the driver depresses the control start switch 26 to turn on the control start switch 26, the control state determination unit 17 terminates the adaptive cruise control (ACC) and starts the low-speed following (LSF) control.

By this, when the traveling speed of the vehicle 1 is reduced to the second predetermined vehicle speed or lower within the predetermined time period after the operation for requesting the follow-up control is made by the driver, the adaptive cruise control is terminated and the low-speed following (LSF) control is started. In addition, the adaptive cruise control is continued when the speed of vehicle 1 is not reduced to the second predetermined vehicle speed or lower within the predetermined time without starting the low-speed following control.

Accordingly, even if the operation for switching from the adaptive cruise control to the low-speed following control was made by the driver when the traveling speed of the vehicle 1 is greater than the predetermined speed 2 (for example, 40 km/h), the low-speed following control is started when the traveling speed of vehicle 1 is reduced to the predetermined speed 2 (for example, 40 km/h) or lower within a predetermined time period. Thus, the gap between the control by the apparatus and the driving experience by the driver can be eliminated. Even if, for example, the low-speed following control is erroneously requested when the vehicle 1 is traveling at a high speed, the adaptive cruise control is continued when the traveling speed of vehicle 1 does not become the predetermined speed 2 (for example, 40 km/h) or lower. Thus, unnecessary switching between the adaptive cruise control (ACC) and the low-speed following (LSF) control can be prevented.

Furthermore, when the driver depress the control start switch 26 to turn on the control start switch 26 while the warning means is providing a warning to the driver in the following cases (1) when the adaptive cruise control (ACC) is cancelled due to factors other than an operation by the driver, or (2) when the traveling speed of vehicle 1 is reduced to the predetermined speed 2 (for example, 40 km/h) or lower during the deceleration made by the adaptive cruise control (ACC), or (3) when the inter-vehicle distance between the vehicle 1 and the preceding vehicle is reduced to a predetermined distance or smaller, the control state determination unit 17 starts the low-speed following (LSF) in which the vehicle 1 is made to travel or stop following the preceding vehicle.

By this, even if the vehicle speed of the vehicle is faster than the predetermined speed 2 (for example, 40 km/h) for switching between the adaptive cruise control and the low-speed following control, the driver who receives the warning can start the low-speed following (LSF) control when the traveling speed of the vehicle 1 is reduced to the predetermined speed 2 (for example, 40 km/h) at which the low-speed following (LSF) control is to be executed or lower.

Thus, the adaptive cruise control (ACC) and the low-speed following (LSF) control can be properly executed, and it is ensured that the adaptive cruise control (ACC) can be switched to low-speed following (LSF) control by the operation by the driver in a manner which is consistent with the driving experience by the driver.

Second Embodiment

Control State Transition

The state transition of driving control states in the control state determination unit 17 according to the second embodiment will be described with reference to the drawings.

FIG. 4 is a state diagram of driving control states in the control state determination unit 17.

In FIG. 4, as described previously, the driving control states are included of three states: A:OFF, B:FOLLOW-UP, and C:STOP HOLD. Among them, in the A:OFF state, the driving control by the driving control apparatus is not executed. In the B:FOLLOW-UP state, the driving control by the driving control apparatus is executed. In the C:STOP HOLD state, after the preceding vehicle that the vehicle 1 follows stops, the vehicle 1 stops following the preceding vehicle, and remains stopped.

The control state determination unit 17 causes a driving control state to be transitioned in response to various inputs described below, as shown in FIG. 4.

First, in the A:OFF driving control state, if the driver depresses the control start switch 26 while the preceding vehicle that the vehicle 1 follows is detected, the control state determination unit 17 transitions the driving control state from the A:OFF state to the B:FOLLOW-UP state (state transition SE1).

In contrast, in the B:FOLLOW-UP driving control state, if the driver depresses the cancel switch 27 or presses the brake pedal, the control state determination unit 17 transitions the driving control state from the B:FOLLOW-UP state to the A:OFF state (state transition SE2).

Furthermore, in the B:FOLLOW-UP driving control state, if the preceding vehicle is stopped and the vehicle stops in a predetermined position behind the preceding vehicle, the control state determination unit 17 transitions the driving control state from the B:FOLLOW-UP state to the C:STOP HOLD state (state transition SE3).

Furthermore, in the C:STOP HOLD driving control state, if the driver depresses the start/stop switch 25 or presses the accelerator pedal, the control state determination unit 17 transitions the driving control state from the C:STOP HOLD state to the B:FOLLOW-UP state (state transition SE4) In contrast, in the A:OFF driving control state, if the driver depresses the control start switch 26 when the preceding vehicle that the vehicle 1 follows is stopped and the vehicle 1 stops behind the preceding vehicle, the control state determination unit 17 transitions the driving control state directly from the A:OFF state to the C:STOP HOLD state (state transition SE5).

Furthermore, in the C:STOP HOLD driving control state, if the driver depresses the cancel switch 27 or presses the brake pedal, the control state determination unit 17 transitions the driving control state directly from the C:STOP HOLD state to the A:OFF state (state transition SE6).

Description of B:FOLLOW-UP State

The B:FOLLOW-UP state in the above-described driving control will be described in detail. The above-described B:FOLLOW-UP state in the driving control has two states. One is a state in which an adaptive cruise control (ACC) is executed in which the vehicle 1 is made to travel while keeping a certain inter-vehicle distance between the vehicle 1 and the preceding vehicle when the vehicle 1 and the preceding vehicle travel at a speed at which the vehicle 1 is not required to be stopped or started following the preceding vehicle. The other is a state in which a low-speed following (LSF) control is executed in which the vehicle 1 is made to travel or stop following the preceding vehicle when the vehicle 1 and the preceding vehicle travel at a speed at which the vehicle 1 is required to be stopped or started following the preceding vehicle. In other words, the state transition between the B:FOLLOW-UP state and the C:STOP HOLD state occurs when the low-speed following (LSF) control is executed.

Figure 9:
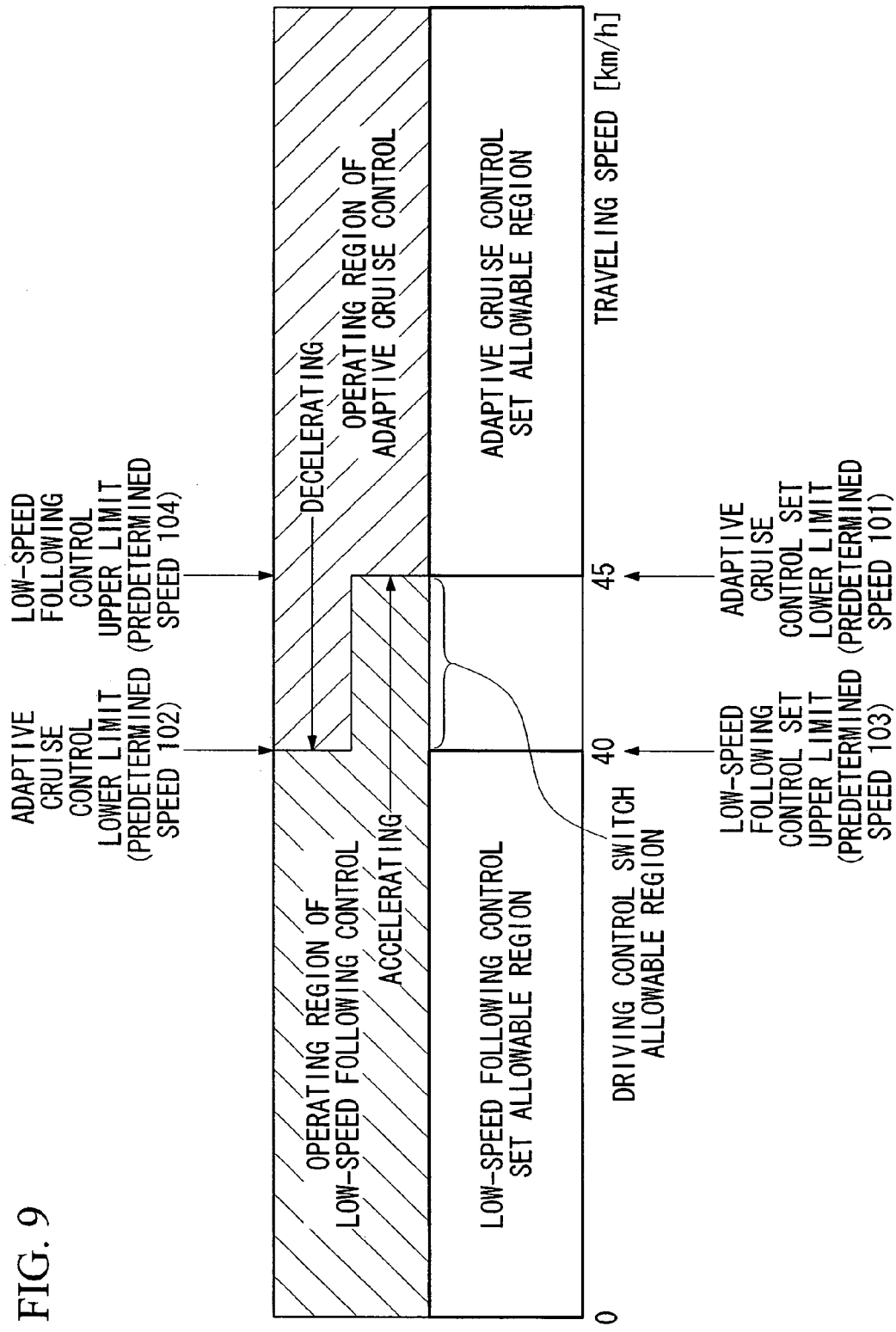
FIG. 9 is a diagram illustrating the vehicle speed regions for executing either the adaptive cruise control or the low-speed following control according to the driving control apparatus of the above-described embodiment.

The switching between the adaptive cruise control (ACC) and the low-speed following (LSF) control will be explained in detail with reference to FIG. 9. FIG. 9 is a diagram illustrating traveling speed regions for executing the adaptive cruise control (ACC) and the low-speed following (LSF) control. In FIG. 9, the horizontal axis indicates the traveling speed of the vehicle 1. This diagram shows the relationship between regions of the traveling speed of the vehicle 1 and the executed corresponding control mode (ACC or LSF), and the speed limits at which the modes are switched. More specifically, as shown in FIG. 9, in the region in which the traveling speed of the vehicle 1 is equal to or lower than a predetermined speed 103 (for example, 40 km/h), the low-speed following (LSF) control can be set (i.e., the low-speed following control set allowable region). Furthermore, in the region in which the traveling speed of the vehicle 1 is equal to or higher than a predetermined speed 101 (for example, 45 km/h), the adaptive cruise control (ACC) can be set (i.e., adaptive cruise control set allowable region).

When the traveling speed of the vehicle 1 is increased to the predetermined speed 104 (for example, 45 km/h) or higher while the low-speed following (LSF) control is executed, the low-speed following (LSF) control is continued and the traveling speed of the vehicle 1 is controlled so that it does not exceed the predetermined speed 104 (for example, 45 km/h). Furthermore, when the traveling speed of the vehicle 1 is reduced to the predetermined speed 102 (for example, 40 km/h) or lower while the adaptive cruise control (ACC) is executed, the adaptive cruise control (ACC) is automatically terminated. However, the low-speed following (LSF) control is not started unless the adaptive cruise control is explicitly instructed by the depression of the control start switch 26 by the driver. In this case, the driver manually drives. When the follow-up control is requested by the depression of the control start switch 26 by the driver while the adaptive cruise control (ACC) is executed, the low-speed following (LSF) control is started even if the traveling speed of vehicle 1 is equal to or lower than the predetermined speed 101 (for example, 40 km/h), which will be described below in detail.

In other words, the predetermined speed 101 (for example, 45 km/h) is the lower speed limit to set the adaptive cruise control (ACC).

The predetermined speed 102 (for example, 40 km/h) is the lower speed limit to execute the adaptive cruise control (ACC).

Furthermore, the predetermined speed 103 (for example, 40 km/h) is the upper speed limit to set the low-speed following (LSF) control.

The predetermined speed 104 (for example, 45 km/h) is the upper speed limit to execute the low-speed following (LSF) control.

The region in which the traveling speed of the vehicle 1 is accelerated from the predetermined speed 103 (for example, 40 km/h) to the predetermined speed 101 (for example, 45 km/h) while the low-speed following control (LSF) is executed is the region in which switching of the driving control modes is allowed.

Start, Termination, and Switching Operations of Adaptive Cruise Control

Next, decision-making operations as to whether to start or terminate the adaptive cruise control (ACC) or the low-speed following control (LSF), or to switch between them, made by the control state determination unit 17 will be described with reference to the drawings.

Figure 10:
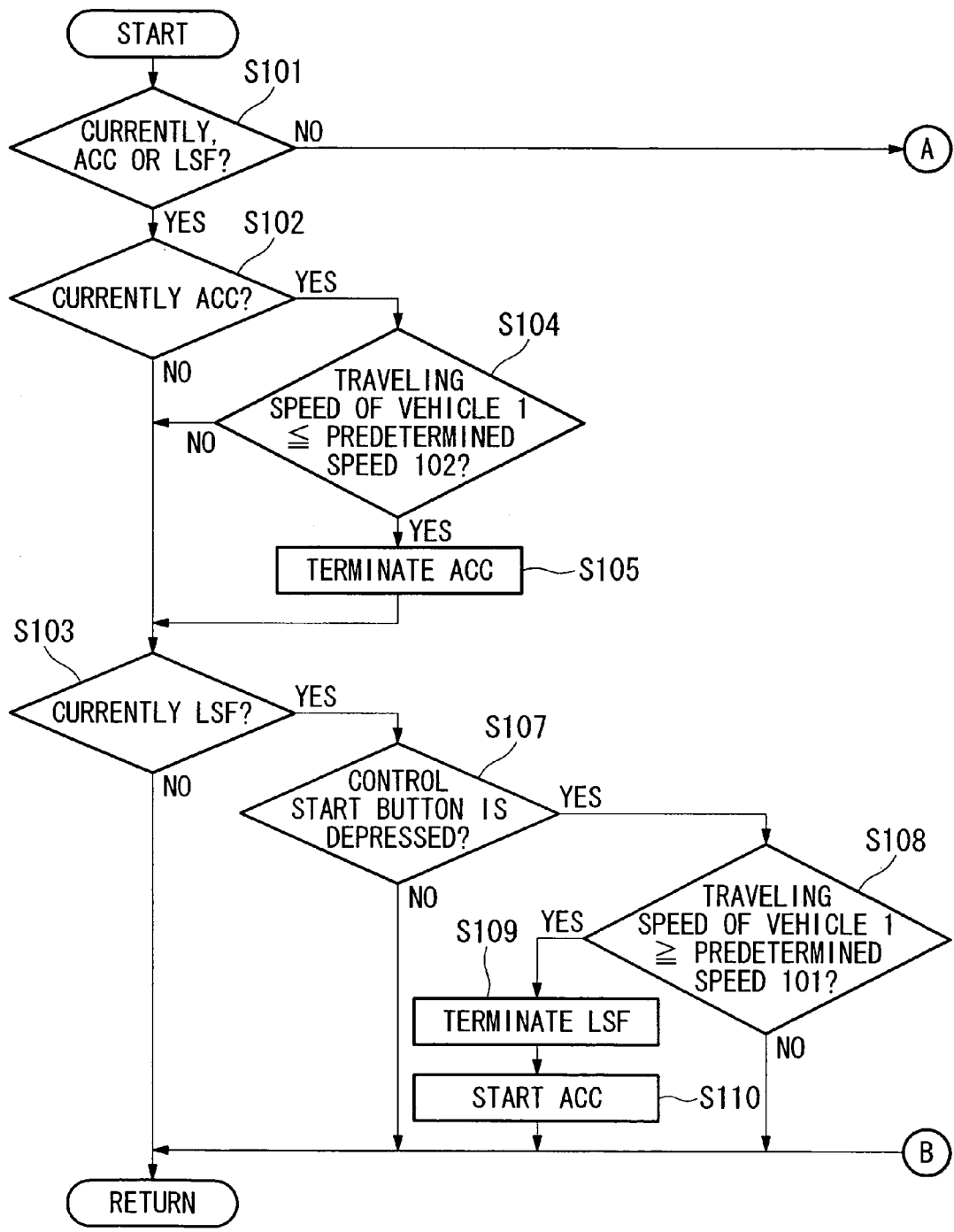
FIG. 10 is a flowchart illustrating decision-making operations as to whether to start or terminate the adaptive cruise control or the low-speed following control, or to switch between them, made by the driving control apparatus of the above-described embodiment.
Figure 11:
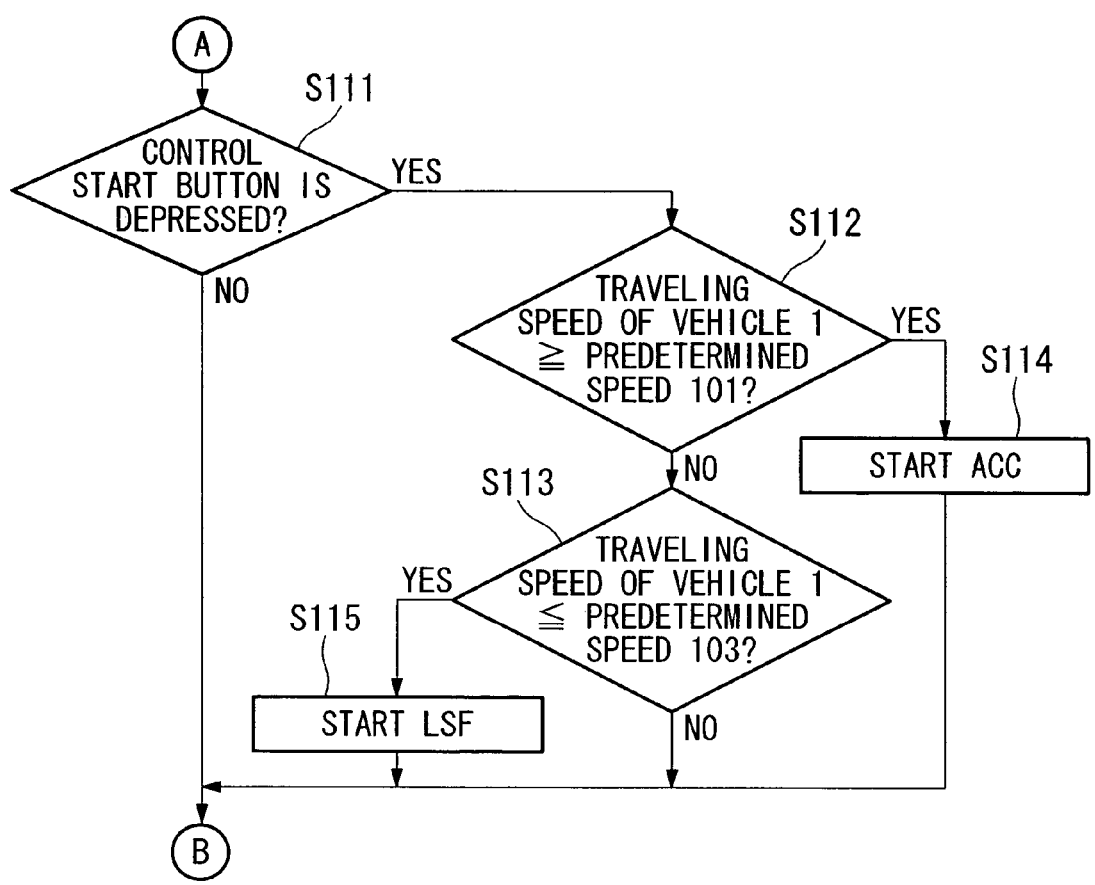
FIG. 11 is a flowchart illustrating decision-making operations as to whether to start or terminate the adaptive cruise control or the low-speed following control, or to switch between them, made by the driving control apparatus of the above-described embodiment.

Referring to flowcharts in FIGS. 10 and 11, decision-making operations as to whether to start or terminate the adaptive cruise control (ACC) or the low-speed following control (LSF), or to switch between them will be described. FIGS. 10 and 11 are flowcharts illustrating decision-making operations as to whether to start or terminate the adaptive cruise control (ACC) or the low-speed following (LSF) control, or to switch between them, made by the control state determination unit 17. The control state determination unit 17 regularly starts the processing shown in FIGS. 10 and 11.

In FIG. 10, the control state determination unit 17 regularly starts and determines whether or not the adaptive cruise control (ACC) or the low-speed following (LSF) control is currently executed on the preceding vehicle (step S110).

When it is determined that the adaptive cruise control (ACC) or the low-speed following (LSF) control is currently executed for the preceding vehicle in Step S101 (i.e., YES in Step S101), the control state determination unit 17 determines whether or not the current driving control is the adaptive cruise control (ACC) on the preceding vehicle (Step S102).

Then, when it is determined that the current driving control is not the adaptive cruise control (ACC) on the preceding vehicle in Step S102 (i.e., NO in Step S102), the control state determination unit 17 determines whether or not the current driving control is the low-speed following (LSF) control (Step S103).

When the current driving control is not the low-speed following (LSF) control on the preceding vehicle in Step S103 (i.e., NO in Step S1103), the control state determination unit 17 finishes the current decision-making operation without executing any processing.

When the current driving control is the low-speed following (LSF) control on the preceding vehicle in Step S102 (i.e., YES in Step S102), the control state determination unit 17 determines that the traveling speed of the vehicle 1 is equal to or lower than the predetermined speed 102 (for example, 40 km/h) (Step S1104).

When it is determined that the traveling speed of the vehicle 1 is not the predetermined speed 102 (for example, 40 km/h) or lower in Step 104 (i.e., NO in Step S104), the control state determination unit 17 proceeds to Step S103 without executing any processing.

In contrast, when it is determined that the traveling speed of the vehicle 1 is the predetermined speed 102 (for example, 40 km/h) or lower in Step S104 (i.e., YES in Step S104), the control state determination unit 17 terminates the adaptive cruise control (ACC) on the preceding vehicle (Step S105), and proceeds to Step S103.

Furthermore, when the current driving control is the low-speed following (LSF) control on the preceding vehicle in Step S103 (i.e., YES in Step S103), the control state determination unit 107 determines whether or not the control start switch 26 has been depressed by the driver, in other words, whether or not an output signal of the control start switch 26 has been changed from OFF to ON (Step S107).

When it is determined that the control start switch 26 has not been depressed by the driver, in other words, the output signal of the control start switch 26 has not been changed from OFF to ON in Step S107 (i.e., NO in Step S107), the control state determination unit 17 finishes the current decision-making operation without executing any processing.

Furthermore, when it is determined that the control start switch 26 has been depressed by the driver, in other words, the output signal of the control start switch 26 has been changed from OFF to ON in Step S107 (i.e., YES in Step S107), the control state determination unit 17 determines whether or not the traveling speed of the vehicle 1 is the predetermined speed 103 (for example, 40 km/h) or higher (Step S108).

When it is determined that the traveling speed of the vehicle 1 is not the predetermined speed 103 (for example, 40 km/h) or higher in Step S108 (i.e., NO in Step S108), the control state determination unit 17 finishes decision-making operation in this time.

In contrast, it is determined that the traveling speed of the vehicle 103 is the predetermined speed 103 (for example, 40 km/h) or higher in Step 108 (i.e., YES in Step S108), the control state determination unit 17 terminates the low-speed following (LSF) control on the preceding vehicle (Step S109), starts the adaptive cruise control (ACC) (Step S110), and proceeds to Step S6.

In contrast, when it is determined that neither the adaptive cruise control (ACC) nor the low-speed following (LSF) control is currently executed on the preceding vehicle in the above-described Step S101 (i.e., NO in Step S101), the control state determination unit 17 proceeds to Step S111 of FIG. 11, in which it is determined whether or not the control start switch 26 has been depressed by the driver, in other words, whether or not an output signal of the control start switch 26 has been changed from OFF to ON (Step S111).

When it is determined that the control start switch 26 has not been depressed by the driver, in other words, the output signal of the control start switch 26 has not been changed from OFF to ON in Step S111 (i.e., NO in Step S11), the control state determination unit 17 finishes the current decision-making operation without executing any processing.

Furthermore, when it is determined that the control start switch 26 has been depressed by the driver, in other words, the output signal of the control start switch 26 has been changed from OFF to ON in Step S1 (i.e., YES in Step S111), the control state determination unit 17 determines whether or not the traveling speed of the vehicle 1 is the predetermined speed 101 (for example, 45 km/h) or higher (Step S112).

When the vehicle speed of the vehicle 1 is not the predetermined speed 101 (for example, 45 km/h) or higher in Step S112 (i.e., NO in Step S112), the control state determination unit 17 determines whether or not the vehicle speed of the vehicle 1 is the predetermined speed 103 (for example, 40 km/h) or lower (Step S113).

When it is determined that the traveling speed of the vehicle 1 is not the predetermined speed 103 (for example, 40 km/h) or lower in Step S113 (i.e., NO in Step S113), the control state determination unit 17 finishes decision-making operation in this time.

In contrast, when the vehicle speed of the vehicle 1 is the predetermined speed 101 (for example, 45 km/h) or higher in Step S112 (i.e., YES in Step S112), the control state determination unit 17 starts the adaptive cruise control (ACC) (Step S114) and proceeds to Step S24.

Furthermore, when it is determined that the traveling speed of the vehicle 1 is the predetermined speed 103 (for example, 40 km/h) or lower in Step 113 (i.e., YES in Step S113), the control state determination unit 17 starts the low-speed following (LSF) control (Step S115) and proceeds to Step S24.

Furthermore, the decision-making operation as to switch between the adaptive cruise control (ACC) and the low-speed following (LSF) control will be described more concretely with reference to a timing chart. FIG. 12 is a timing chart that shows decision-making operation as to switch between the adaptive cruise control (ACC) and the low-speed following (LSF) control made by the control state determination unit 17 of the driving control apparatus of the present embodiment. As shown in (a) TRAVELING SPEED OF VEHICLE 1 and (b) SET ALLOWABLE REGION in FIG. 12, before the traveling speed of the vehicle 1 reaches the predetermined speed 101 (for example, 45 km/h which is the upper speed limit to set the adaptive cruise control) exceeding the predetermined speed 103 (for example, 40 km/h which is the upper speed limit to set the low-speed following control), as indicated by (c) OUTPUT SIGNAL OF CONTROL START SWITCH 26, when an operation requesting the follow-up control is input by the driver at time t1, as shown in (d) DRIVING CONTROL OPERATING STATUS, the control state determination unit 17 terminates the low-speed following control (LSF) and starts the adaptive cruise control (ACC) at that time (for example, at time t2). Accordingly, even if (a) TRAVELING SPEED OF VEHICLE 1 exceeds the predetermined speed 104 (for example, 45 km/h which is the low-speed following control upper speed limit) at time t3, the traveling speed of the vehicle 1 is not limited to the predetermined speed 104, and an adequate driving control following the preceding vehicle is executed by the adaptive cruise control (ACC).

It should be noted that, as the criteria for decision-making operations as to whether to start or terminate the adaptive cruise control (ACC) or the low-speed following (LSF) control, or to switch between them, made by the control state determination unit 17, the predetermined speed 101 is 45 km/h, for example, and the predetermined speed 103 is 40 km/h, for example in the embodiment described above. However, the predetermined speed 101 and the predetermined speed 103 can be set to any values provided that the predetermined speed 101 is greater than the predetermined speed 103. Furthermore, the predetermined speed 101 may be any value provided that it is equal to or lower than the predetermined speed 104. Similarly, the predetermined speed 102 may be any value provided that it is equal to or lower than the predetermined speed 103.

In the above-described embodiment, the control state determination unit 17 terminates the low-speed following control (LSF) and starts the adaptive cruise control (ACC) when the driver depresses the control start switch 26 to turn on the control start switch 26 if the traveling speed of the vehicle 1 is the predetermined speed 103 (for example, 40 km/h) or higher during the low-speed following control (LSF). It is also possible to terminate the low-speed following control (LSF) and start the adaptive cruise control (ACC) when the traveling speed of the vehicle 1 is increased to the predetermined speed 101 (for example, 45 km/h) or higher, instead of immediately switching between the low-speed following control (LSF) and the adaptive cruise control (ACC).

The region in which switching of the driving control modes is allowed that was described with reference to FIG. 9 is the region to accelerate the traveling speed of the vehicle 1 from the predetermined speed 103 (for example, 40 km/h) to the predetermined speed 101 (for example, 45 km/h) while the low-speed following control (LSF) is executed. Thus, it is possible to terminate the low-speed following control (LSF) and start the adaptive cruise control (ACC) if the driver depresses the control start switch 26 to turn on the control start switch 26 provided that the traveling speed of the vehicle 1 is the predetermined speed 103 (for example, 40 km/h) or higher while the low-speed following control (LSF) is executed.

As described previously, the driving control apparatus of the present embodiment includes a radar apparatus 11, and determines a preceding vehicle that the vehicle 1 follows among detected objects and executes the adaptive cruise control on the detected preceding vehicle. The control state determination unit 17 executes the adaptive cruise control (ACC) to make the vehicle 1 travel following the preceding vehicle at a traveling speed equal to or greater than the predetermined rate 102 (for example, 40 km/h) when the driver depresses the control start switch 26 to turn on the control start switch 26 while the vehicle 1 travels at a speed equal to or higher than the predetermined speed 1011 (for example, 45 km/h). In contrast, the control state determination unit 17 executes the low-speed following (LSF) control to make the vehicle 1 travel or stop following the preceding vehicle at a speed equal to or lower than the predetermined speed 104 (for example, 45 km/h) if the driver depresses the control start switch 26 to turn on the control start switch 26 while the vehicle 1 travels at a speed equal to or lower than the predetermined speed 103 (for example, 45 km/h).

Thus, the adaptive cruise control (ACC) is executed in which the vehicle 1 is made to travel following the preceding vehicle while keeping a certain distance from the preceding vehicle down to the predetermined speed 102 (for example, 40 km/h) at which the vehicle 1 is not required to be stopped or started following the preceding vehicle when the driver requests the follow-up control while the vehicle 1 travels at a speed equal to or higher than the predetermined speed 101 (for example, 45 km/h). In contrast, the low-speed following (LSF) control is executed in which the vehicle 1 is made to travel or stop following the preceding vehicle up to the predetermined speed 104 (for example, 45 km/h) at which the vehicle 1 is no more required to be stopped or started following the preceding vehicle when the driver requests the follow-up control while the vehicle 1 travels at a speed equal to or lower than the predetermined speed 103 (for example, 40 km/h) at which the vehicle 1 is required to be stopped or started following the preceding vehicle.

By this, since the switching of the driving control modes is executed based on the vehicle speed of the vehicle 1 when the control start switch 26 is depressed, the driving control modes can be switched using a single switch, which enables improvement of the usability and reduction in the cost. In addition, the vehicle 1 can be travel adequately by making the vehicle travel following a preceding vehicle employing between the adaptive cruise control (ACC) or the low-speed following (LSF) control while switching between the adaptive cruise control (ACC) and the low-speed following (LSF) control depending on travel conditions.

The control state determination unit 17 terminates the low-speed following control (LSF) and starts the adaptive cruise control (ACC) when the driver depresses the control start switch 26 to turn on the control start switch 26 when the traveling speed of the vehicle 1 is the predetermined speed 103 (for example, 40 km/h) or higher during the low-speed following control (LSF).

Thus, it is possible to terminate the low-speed following control (LSF) and start the adaptive cruise control (ACC) even if the traveling speed of the vehicle 1 is equal to or lower than the predetermined speed 101 (for example, 45 km/h) when the traveling speed of the vehicle 1 is the predetermined speed 103 (for example, 40 km/h) or higher while the low-speed following control (LSF) is executed.

Accordingly, by permitting the switching from the low-speed following control (LSF) to the adaptive cruise control (ACC) when the traveling speed of the vehicle 1 is the predetermined speed 103 (for example, 40 km/h) or higher, the gap between the control by the apparatus and the driving experience by the driver can be eliminated. In addition, the adaptive cruise control (ACC) can be switched from the low-speed following control (LSF) without ignoring an operation made at a low speed.

The control state determination unit 17 terminates the low-speed following control (LSF) and starts the adaptive cruise control (ACC) if the driver depresses the control start switch 26 to turn on the control start switch 26 when the traveling speed of the vehicle 1 is the predetermined speed 103 (for example, 40 km/h) or higher during the low-speed following control (LSF), provided that the vehicle 1 is accelerating. Thus, the adaptive cruise control (ACC) is started only when the inter-vehicle distance between the vehicle 1 and the preceding vehicle is a certain value, or when inter-vehicle distance is increasing.

Accordingly, the possibility of a reduced inter-vehicle distance between the vehicle 1 and the preceding vehicle can be eliminated, and the vehicle 1 can be made to travel following the preceding vehicle any time.

While preferred embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A driving control apparatus comprising:
    a vehicle speed detecting unit that detects a traveling speed of a vehicle;
    a follow-up control request detecting unit that detects an operation by a driver requesting a follow-up control;
    an object detecting unit that is installed in the vehicle and detects objects that are present in a direction in which the vehicle travels;
    a preceding vehicle determining unit that determines a preceding vehicle in front of the vehicle and among the detected objects;
    a target inter-vehicle distance determining unit that determines a target inter-vehicle distance between the vehicle and the preceding vehicle;
    a target vehicle speed determining unit that determines a target vehicle speed of the vehicle based on a signal from the object detecting unit and the determined target inter-vehicle distance; and
    a follow-up control unit that controls a follow-up control based on the determined target vehicle speed and the traveling speed of the vehicle,
    wherein the follow-up control unit, when the operation by the driver requesting the follow-up control is detected while the vehicle is traveling at a speed equal to or higher than a first predetermined vehicle speed, executes an adaptive cruise control in which the vehicle is made to travel at a speed higher than a second predetermined vehicle speed that is lower than the first predetermined vehicle speed, and
    wherein the follow-up control unit, when the operation by the driver requesting the follow-up control is detected while the vehicle is traveling at a speed equal to or lower than a third predetermined vehicle speed that is lower than the first predetermined vehicle speed, executes a low-speed following control in which the vehicle is made to travel or stop while following the preceding vehicle.

2. The driving control apparatus according to claim 1, wherein the second predetermined vehicle speed is equal to or lower than a third predetermined vehicle speed.

3. The driving control apparatus according to claim 1, wherein the follow-up control unit terminates the adaptive cruise control and starts the low-speed following control when the traveling speed of the vehicle is reduced to the second predetermined vehicle speed or lower within a predetermined time period after the operation by the driver requesting the follow-up control is detected while the adaptive cruise control is executed.

4. The driving control apparatus according to claim 1, wherein the follow-up control unit continues the adaptive cruise control within the traveling speed of the vehicle is not reduced to the second predetermined vehicle speed or lower within a predetermined time period after the operation by the driver requesting the follow-up control is detected while the adaptive cruise control is executed.

5. The driving control apparatus according to claim 1, further comprising:
    a warning unit that provides the driver with a warning according to a control status of the follow-up control unit,
    wherein the follow-up control unit starts the low-speed following control when the operation by the driver requesting the follow-up control is detected while the warning unit is providing the warning and when the traveling speed of the vehicle is reduced to the second predetermined vehicle speed or lower within a predetermined time period after the operation is detected.

6. The driving control apparatus according to claim 5, wherein the warning unit provides the driver with the warning in one of the following cases: when the adaptive cruise control is terminated by a factor other than an operation by the driver; when the traveling speed of the vehicle is reduced to the second predetermined vehicle speed or lower during a deceleration control related to the adaptive cruise control; and when the inter-vehicle distance between the vehicle and the preceding vehicle is reduced to a predetermined distance or shorter.

7. A driving control apparatus comprising:
a vehicle speed detecting unit that detects a traveling speed of a vehicle;
a follow-up control request detecting unit that detects an operation by a driver requesting a follow-up control;
an object detecting unit that is installed in the vehicle and detects objects that are present in a direction in which the vehicle travels;
a preceding vehicle determining unit that determines a preceding vehicle in front of the vehicle and among the detected objects;
a target inter-vehicle distance determining unit that determines a target inter-vehicle distance between the vehicle and the preceding vehicle;
a target vehicle speed determining unit that determines a target vehicle speed of the vehicle based on a signal from the object detecting unit and the determined target inter-vehicle distance; and
a follow-up control unit that controls a follow-up control based on the determined target vehicle speed and the traveling speed of the vehicle,
wherein the follow-up control unit, when the operation by the driver requesting the follow-up control is detected while the vehicle is traveling at a speed equal to or higher than a first predetermined vehicle speed, executes an adaptive cruise control in which the vehicle is made to travel at a speed equal to or higher than a second predetermined vehicle speed that is lower than the first predetermined vehicle speed, and
wherein the follow-up control unit, when the operation by the driver requesting the follow-up control is detected while the vehicle is traveling at a speed equal to or lower than a third predetermined vehicle speed that is lower than the first predetermined vehicle speed, executes a low-speed following control in which the vehicle is made to travel or stop while following the preceding vehicle, the vehicle traveling at a speed equal to or lower than a fourth predetermined vehicle speed that is higher than a third predetermined vehicle speed.

8. The driving control apparatus according to claim 7, wherein the follow-up control unit terminates the low-speed following control and starts the adaptive cruise control if the operation by the driver requesting the follow-up control is detected when the traveling speed of the vehicle is equal to or higher than the third predetermined vehicle speed while the low-speed following control is executed.

9. The driving control apparatus according to claim 7, wherein the follow-up control unit terminates the low-speed following control and starts the adaptive cruise control when the traveling speed of the vehicle is increased to the first predetermined vehicle speed or higher if the operation by the driver requesting the follow-up control is detected when the traveling speed of the vehicle is equal to or higher than the third predetermined vehicle speed while the low-speed following control is executed.

10. The driving control apparatus according to claim 1, wherein the vehicle is made to travel at a speed lower than a fourth predetermined vehicle speed when the follow-up control unit executes the low-speed following control.

* * * * *